US009471266B2

(12) United States Patent
Anno

(10) Patent No.: US 9,471,266 B2
(45) Date of Patent: Oct. 18, 2016

(54) PRINTING SYSTEM WITH PRINTING APPARATUS AND PRINTING CONTROL APPARATUS FOR REGISTERING AND MANAGING SHEET HOLDING UNITS BASED ON SHEET ATTRIBUTES

(71) Applicant: CANON KABUSHIKI KAISHA, Tokyo (JP)

(72) Inventor: Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/606,347

(22) Filed: Jan. 27, 2015

(65) Prior Publication Data
US 2015/0213347 A1 Jul. 30, 2015

(30) Foreign Application Priority Data

Jan. 28, 2014 (JP) .................................. 2014-013793

(51) Int. Cl.
G06F 3/12 (2006.01)
G06K 15/02 (2006.01)
H04N 1/00 (2006.01)
G06K 15/00 (2006.01)

(52) U.S. Cl.
CPC ............ *G06F 3/1256* (2013.01); *G06F 3/121* (2013.01); *G06F 3/1204* (2013.01); *G06F 3/1205* (2013.01); *G06F 3/1211* (2013.01); *G06F 3/1212* (2013.01); *G06F 3/1234* (2013.01); *G06F 3/1253* (2013.01); *G06F 3/1254* (2013.01); *G06F 3/1257* (2013.01); *G06F 3/1258* (2013.01); *G06F 3/1288* (2013.01); *G06K 15/002* (2013.01); *G06K 15/1805* (2013.01); *G06K 15/4065* (2013.01); *H04N 1/00482* (2013.01); *H04N 1/00708* (2013.01); *H04N 1/00771* (2013.01); *H04N 1/00954* (2013.01)

(58) Field of Classification Search
None
See application file for complete search history.

(56) References Cited

U.S. PATENT DOCUMENTS

| | | | | |
|---|---|---|---|---|
| 5,031,116 A | * | 7/1991 | Shukunami | H04N 1/33315 358/1.2 |
| 6,285,844 B1 | * | 9/2001 | Kuga | H04N 1/00567 399/85 |
| 6,850,337 B1 | * | 2/2005 | Anderson | G06F 3/1207 358/1.12 |
| 7,317,882 B2 | * | 1/2008 | Dombrowski | G03G 15/6508 399/81 |
| 7,605,935 B2 | * | 10/2009 | Nakamaki | G06K 15/00 358/1.14 |

(Continued)

FOREIGN PATENT DOCUMENTS

JP 2007-241425 A 9/2007

*Primary Examiner* — Scott A Rogers
(74) *Attorney, Agent, or Firm* — Canon USA, Inc. IP Division

(57) ABSTRACT

A printing system includes a printing control apparatus and a printing apparatus. The printing control apparatus stores, in association with a sheet holding unit of the printing apparatus, a combination of stored first attribute information about a sheet and stored second attribute information about the sheet. The printing control apparatus receives, from the printing apparatus, first attribute information about a sheet to be used in a job. Based on the received first attribute information about the sheet received from the printing apparatus, the printing control apparatus obtains the stored second attribute information and sends the obtained second attribute information to the printing apparatus. The printing apparatus sets the received second attribute information as attribute information about a sheet to be stored in the sheet holding unit. The printing apparatus notifies a user about the sheet holding unit to which the second attribute information is set.

4 Claims, 16 Drawing Sheets

(56) References Cited

U.S. PATENT DOCUMENTS

| | | | | |
|---|---|---|---|---|
| 7,826,073 B2* | 11/2010 | Park | ............... | H04N 1/00482 358/1.13 |
| 8,451,496 B2* | 5/2013 | Ohashi | ............... | G06F 3/1208 358/1.13 |
| 8,630,014 B2* | 1/2014 | Fujiwara | ............... | G06F 3/1255 358/1.2 |
| 8,670,161 B2* | 3/2014 | Salgado | ............... | G06F 3/1255 358/1.14 |
| 8,937,740 B2* | 1/2015 | Sakata | ............... | G06K 15/4065 358/1.15 |
| 8,994,971 B2* | 3/2015 | Fukuda | ............... | G06K 15/4065 358/1.12 |
| 9,019,522 B2* | 4/2015 | Shibata | ............... | G06F 3/1258 358/1.14 |
| 9,235,786 B2* | 1/2016 | Wakana | ............... | G06K 15/16 |
| 2002/0036799 A1* | 3/2002 | Sumiyama | ............... | G06F 3/1205 358/1.15 |
| 2003/0231359 A1* | 12/2003 | Hayashi | ............... | H04N 1/00925 358/498 |
| 2006/0092451 A1* | 5/2006 | Odagiri | ............... | G06K 15/00 358/1.14 |
| 2009/0190936 A1* | 7/2009 | Masui | ............... | B41J 11/003 399/16 |
| 2010/0111546 A1* | 5/2010 | Kubo | ............... | G03G 15/6508 399/16 |
| 2010/0157326 A1* | 6/2010 | Mori | ............... | G03G 15/5029 358/1.5 |
| 2011/0242584 A1* | 10/2011 | Igarashi | ............... | G06F 3/1205 358/1.15 |
| 2012/0002223 A1* | 1/2012 | Tanaka | ............... | G06K 15/007 358/1.9 |
| 2015/0002881 A1* | 1/2015 | Koike | ............... | G06F 3/1294 358/1.14 |
| 2015/0015916 A1* | 1/2015 | Kikuchi | ............... | G06K 15/1848 358/3.24 |
| 2015/0160902 A1* | 6/2015 | Tsujita | ............... | G06F 3/1257 358/1.6 |

* cited by examiner

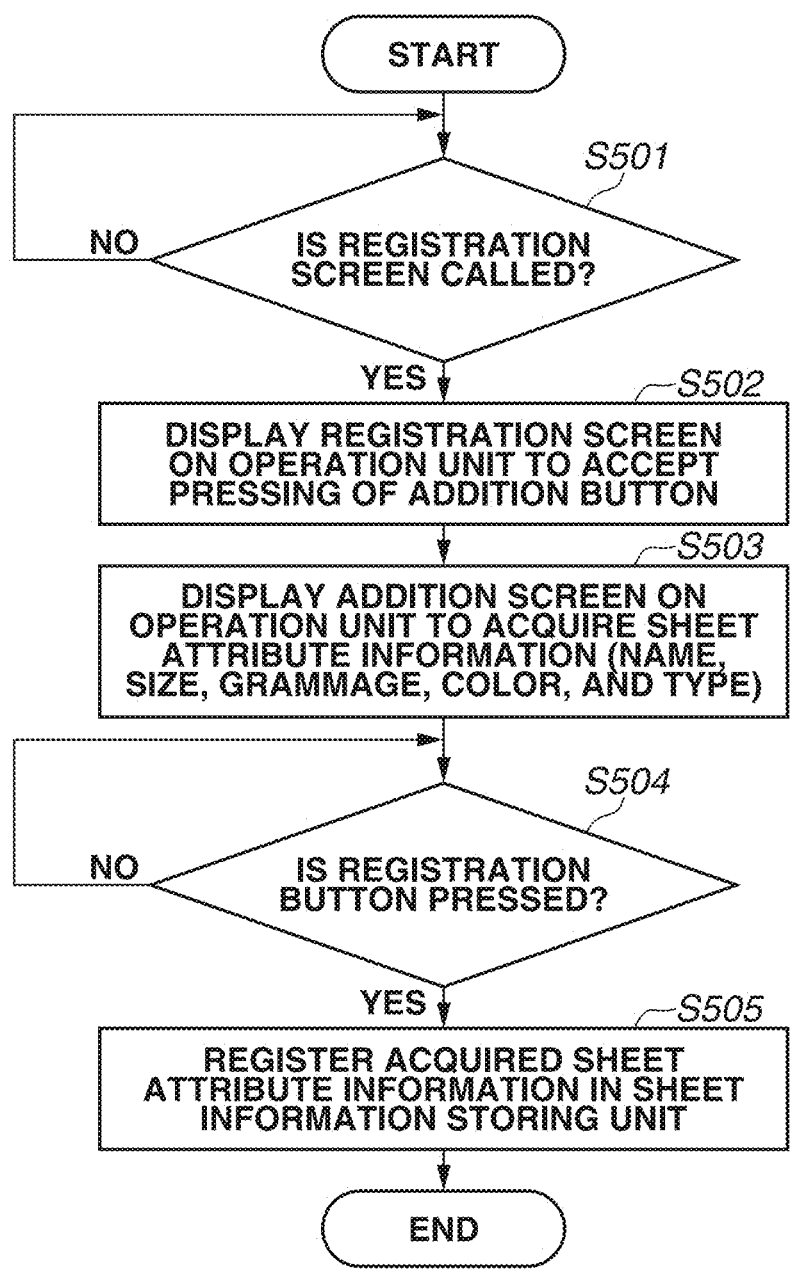

FIG.6A

SHEET INFORMATION REGISTRATION

| ID | NAME | SIZE | GRAMMAGE | COLOR | TYPE |
|---|---|---|---|---|---|
| 001 | A CORPORATION Media1 | A4 | 62 g/m² | White | PLAIN PAPER |
| 002 | A CORPORATION Media2 | A4 | 80 g/m² | Yellow | COATED PAPER |
| 003 | A CORPORATION Custom | A4 | 62 g/m² | Red | PLAIN PAPER |
| 004 | B CORPORATION Premium | A3 | 128 g/m² | White | THICK PAPER |
| 005 | C CORPORATION Excellent | B4 | 150 g/m² | White | THICK PAPER |
| 006 | Paper1 | A4 | 64 g/m² | Blue | COATED PAPER |
| 007 | Paper2 | A3 | 80 g/m² | White | PLAIN PAPER |
| 008 | MyPaper | A4 | 100 g/m² | Yellow | TAB SHEET |
| ... | ... | ... | ... | ... | ... |

[ADD] [DELETE] [CLOSE]

FIG.6B

NEW ADDITION

NAME: A CORPORATION Media1

SHEET CHARACTERISTICS (TYPE/GRAMMAGE/COLOR): PLAIN PAPER, 62 g/m², White  [CUSTOM...]

OUTPUT SHEET SIZE: A4  [CUSTOM...]

[REGISTRATION] [CANCEL]

| SHEET HOLDING UNIT | NAME | SIZE | GRAMMAGE | COLOR | TYPE |
|---|---|---|---|---|---|
| Tray1 | A CORPORATION Media1 | A4 | 62 g/m² | White | PLAIN PAPER |
| | Paper2 | A3 | 80 g/m² | White | PLAIN PAPER |
| | C CORPORATION Excellent | B4 | 150 g/m² | White | THICK PAPER |
| Tray2 | | | | | |
| Tray3 | MyPaper | A4 | 100 g/m² | Yellow | TAB SHEET |
| | B CORPORATION Premium | A3 | 128 g/m² | White | THICK PAPER |
| Tray4 | A CORPORATION Media1 | A4 | 62 g/m² | White | PLAIN PAPER |

*1300*

COPY

<WARNING>

THERE IS NO A3 THICK PAPER LEFT.
REPLENISH Tray3 WITH PAPERS.

OK

*1310*

COPY

<WARNING>

THERE IS NOT A3 THICK PAPER LEFT.
PERFORM SHEET FEEDING SETTING.

OK

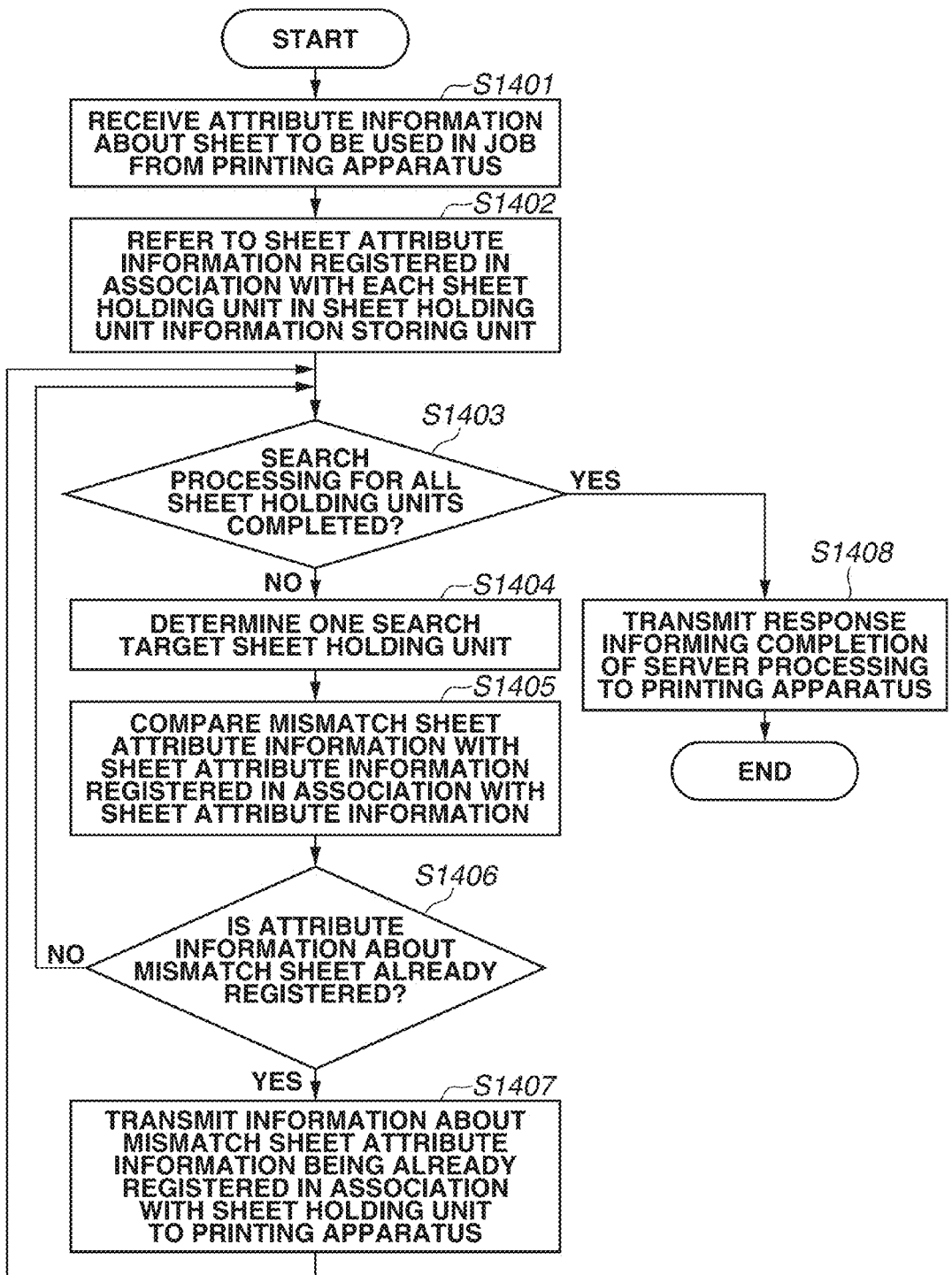

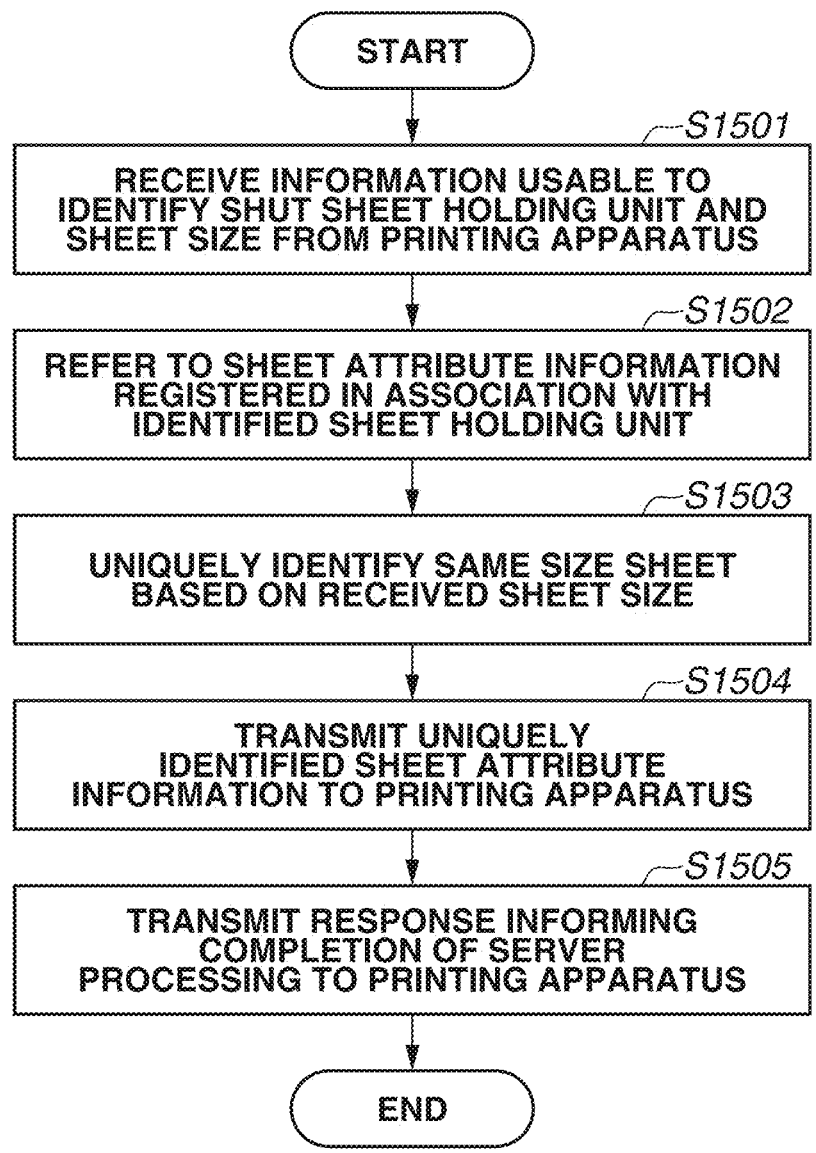

FIG.16A

| SHEET HOLDING UNIT | SIZE | GRAMMAGE/COLOR/TYPE |
|---|---|---|
| Tray1 | A4 | 62 g/m$^2$, White, PLAIN PAPER |
| Tray2 | B4 | 150 g/m$^2$, White, THICK PAPER |
| Tray3 | A4 | 100 g/m$^2$, Yellow, TAB SHEET |
| Tray4 | A4 | 62 g/m$^2$, White, PLAIN PAPER |

FIG.16B

| SHEET HOLDING UNIT | SIZE | GRAMMAGE/COLOR/TYPE |
|---|---|---|
| Tray1 | A4 | 62 g/m$^2$, White, PLAIN PAPER |
| Tray2 | B4 | 150 g/m$^2$, White, THICK PAPER |
| Tray3 | A3 | 128 g/m$^2$, White, THICK PAPER |
| Tray4 | A4 | 62 g/m$^2$, White, PLAIN PAPER |

PRINTING SYSTEM WITH PRINTING APPARATUS AND PRINTING CONTROL APPARATUS FOR REGISTERING AND MANAGING SHEET HOLDING UNITS BASED ON SHEET ATTRIBUTES

BACKGROUND OF THE INVENTION

1. Field of the Invention

The present invention relates to a printing system, a printing apparatus, a printing control apparatus, a sheet management system, a printing control apparatus control method, and a storage medium.

2. Description of the Related Art

When a sheet holding unit provided in a printing apparatus is used to perform a printing operation, storing of sheet attribute information (e.g., sheet name, sheet size, sheet grammage, sheet surface nature, and sheet color) beforehand as sheet holding unit setting value is generally performed. To store sheet attribute information as sheet holding unit setting value, it is required every time to input the sheet attribute information for each sheet holding unit. Therefore, as discussed in Japanese Patent Application Laid-Open No. 2007-241425, it is conventionally known to register attribute information about each sheet beforehand in a sheet management database and let a user select desired sheet attribute information to be stored as sheet holding unit setting value.

According to the technique discussed in Japanese Patent Application Laid-Open No. 2007-241425, if the number of sheets registered in the sheet management database increases, it will take a significant time for a user to find out a desired sheet every time from the great amount of registered sheets. Therefore, for example, in a case where a printing operation is performed with frequently used sheets in a sheet holding unit, setting attribute information about the frequently used sheets as sheet holding unit setting value was a cumbersome work for a user.

On the other hand, in a case where attribute information about a sheet to be used in a job is not stored for any one of sheet holding units, execution of the job will be stopped. In this case, to prevent the job execution from being stopped, a user is required to perform a cumbersome work for finding out the attribute information about the sheet to be used in the job from sheet information registered in the sheet management database and setting the identified attribute information for any one of the sheet holding units.

SUMMARY OF THE INVENTION

According to an aspect of the present invention, a printing system includes a printing control apparatus to communicate with a printing apparatus, wherein the printing control apparatus includes: a control apparatus storing unit configured to store, in association with a sheet holding unit of the printing apparatus, a combination of stored first attribute information about a sheet and stored second attribute information about the sheet, a control apparatus receiving unit configured to receive, from a printing apparatus sending unit of the printing apparatus, first attribute information about a sheet to be used in a job, and a control apparatus sending unit configured to obtain, from the control apparatus storing unit and based on the received first attribute information about the sheet to be used in the job, the stored second attribute information stored in the control apparatus storing unit in combination with the stored first attribute information, and configured to send, to the printing apparatus, the obtained second attribute information about the sheet, and the printing apparatus, wherein the printing apparatus includes: a printing apparatus obtaining unit configured to obtain first attribute information about a sheet to be used in a job, the printing apparatus sending unit configured to send, to the printing control apparatus, the obtained first attribute information about the sheet to be used in the job, a printing apparatus receiving unit configured to receive, from the control apparatus sending unit of the printing control apparatus and based on the sent first attribute information sent by the printing apparatus sending unit, the second attribute information about the sheet stored, in the control apparatus storing unit of the printing control apparatus, in combination with stored first attribute information, a setting unit configured to set the second attribute information, received by the printing apparatus receiving unit, as attribute information about a sheet to be stored in the sheet holding unit, and a notification unit configured to notify a user about the sheet holding unit to which the second attribute information, received by the printing apparatus receiving unit and set as attribute information about the sheet to be stored in the sheet holding unit, is set by the setting unit.

Further features of the present invention will become apparent from the following description of exemplary embodiments with reference to the attached drawings.

BRIEF DESCRIPTION OF THE DRAWINGS

FIG. 5 is a flowchart illustrating processing that can be performed by the server according to the first exemplary embodiment to register sheet attribute information in a sheet information storing unit.

FIGS. 6A and 6B illustrate examples of registration screens that can be displayed on the server according to the first exemplary embodiment to enable a user to register sheet attribute information in the sheet information storing unit.

FIG. 9 illustrates an example of a sheet attribute information table that store sheet information registered in association with each sheet holding unit in the sheet holding unit information storing unit of the server according to the first exemplary embodiment.

FIG. 14 is a flowchart illustrating processing that can be performed by the server according to the first exemplary embodiment to search for a sheet registered in the sheet holding unit information storing unit.

FIG. 15 is a flowchart illustrating processing that can be performed by the server according to the first exemplary embodiment to transmit sheet attribute information uniquely identified from the sheet holding unit information storing unit to the printing apparatus.

FIGS. 16A and 16B illustrate examples of sheet attribute information being set as a setting value of each sheet holding unit in the printing apparatus according to the first exemplary embodiment.

DESCRIPTION OF THE EMBODIMENTS

Exemplary embodiments described below are not intended to narrowly limit the present invention. Further, it is not always required to include all of characteristic features combined in respective exemplary embodiments as solving means of the present invention.

<Digital Printing System>

Figure 1:
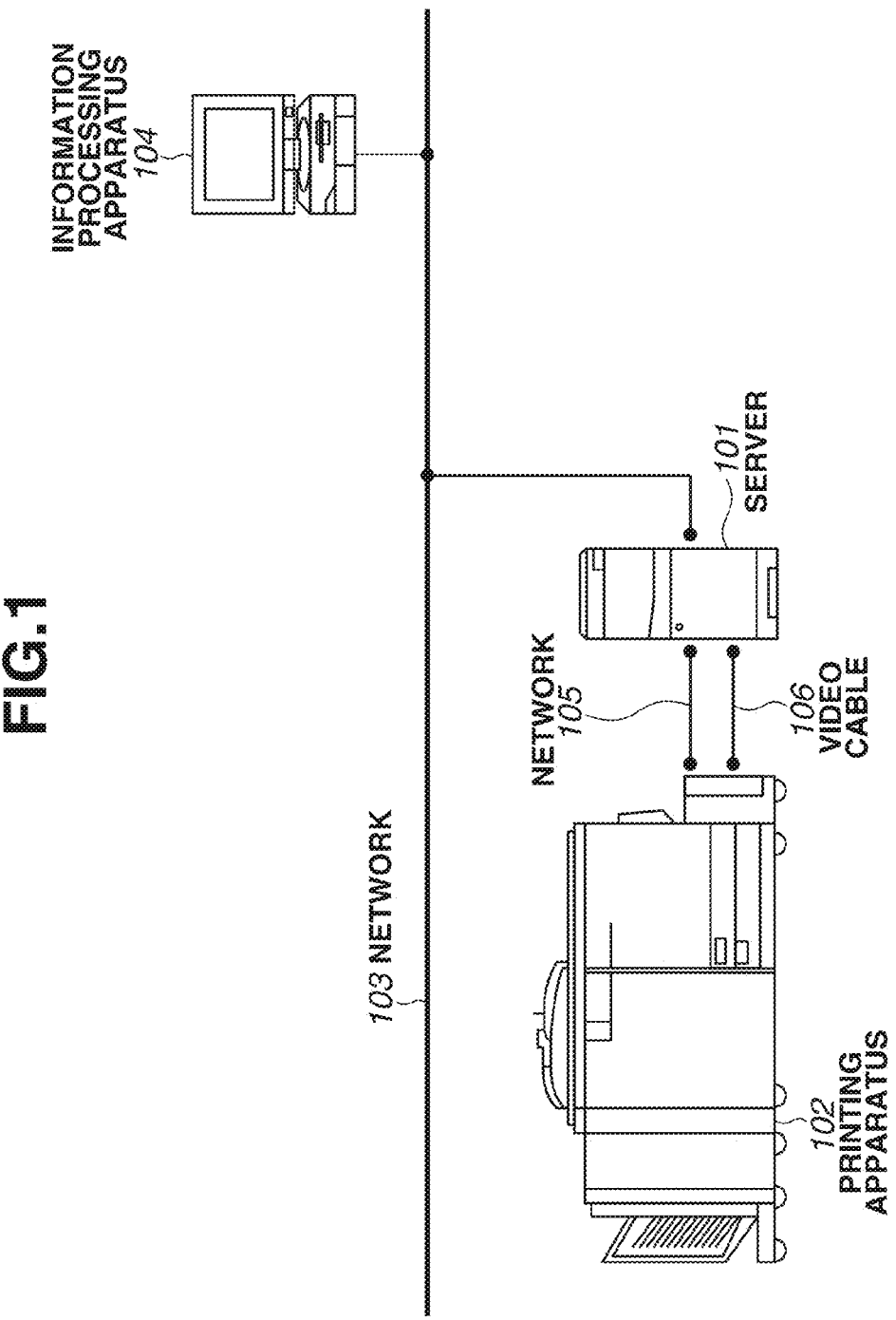
FIG. 1 illustrates a digital printing system according to a first exemplary embodiment of the present invention.

A digital printing system according to a first exemplary embodiment of the present invention is described in detail below with reference to FIG. 1.

In the first exemplary embodiment, for example, the printing system can register sheet attribute information beforehand in association with each sheet holding unit in a server. A user stores sheets in a sheet holding unit of a printing apparatus and transmits size information about the stored sheets to the server. Then, the server transmits another or additional sheet attribute information registered in association with the sheet holding unit to the printing apparatus. Then, the printing apparatus automatically sets the sheet attribute information having been received from the server as setting value of the sheet holding unit.

On the other hand, in a case where attribute information about the sheet to be used in a job is not registered for any one of the sheet holding units of the printing apparatus, the printing apparatus stops executing the job. Therefore, the printing apparatus searches the sheet attribute information registered in the server to find a sheet holding unit for which the attribute information about the sheet to be used in the job is registered beforehand. Then, based on a search result, the printing apparatus notifies a user of the sheet holding unit being registered in association with the attribute information about the sheet to be used in the job. More specifically, the user stores the sheet to be used in the job in the notified sheet holding unit. Therefore, it is feasible to receive the attribute information about the sheet to be used in the job from the server and automatically set the received attribute information as setting value of the sheet holding unit.

The digital printing system according to the first exemplary embodiment is described in detail below.

A digital printing apparatus (i.e., an example of the printing apparatus) 102 has various (e.g., scan, print, and copy) functions. A server 101 has various (e.g., image processing, print control, and job management) functions. An information processing apparatus (e.g., a computer) 104 has various (e.g., application file editing and print instruction) functions.

In the digital printing system, the printing apparatus 102 is connected to the server 101 via a network 105 and a video cable 106. Further, the server 101 can communicate with the information processing apparatus 104 via a network 103 (e.g., a local area network (LAN) or a wide area network (WAN)) or a wireless LAN. The video cable 106 can be used to transfer an image to be printed. The network 105 can be used to transmit and receive other information. Unless otherwise mentioned, the network that connects the printing apparatus 102 and the server 101 is LAN, WAN, or a comparable network as long as it can realize the functions of the present invention.

In the exemplary embodiment of the present invention, the information processing apparatus 104 can transmit and receive various types of data to and from the printing apparatus 102 via the server 101. Further, the server 101 can transfer a print job received from the information processing apparatus 104 via the network 103 to the printing apparatus 102. Each user can use the information processing apparatus 104 to confirm the status of a job and operational states of the server 101 and the printing apparatus 102. Further, each user can operate the server 101 directly or remotely to store sheet attribute information, as sheet holding unit setting value of the printing apparatus 102, for example, in the printing apparatus (which may be also referred to as a sheet management system).

In a case where the information processing apparatus 104 is functionally operable as the server 101, the information processing apparatus 104 can be configured to directly transmit and receive data and commands to and from the printing apparatus 102. In such a case, the information processing apparatus 104 has a configuration similar to that of the server 101 except that the information processing apparatus 104 is connected to the printing apparatus 102 via the network 105 and the video cable 106.

<Configuration of Server>

Figure 2:
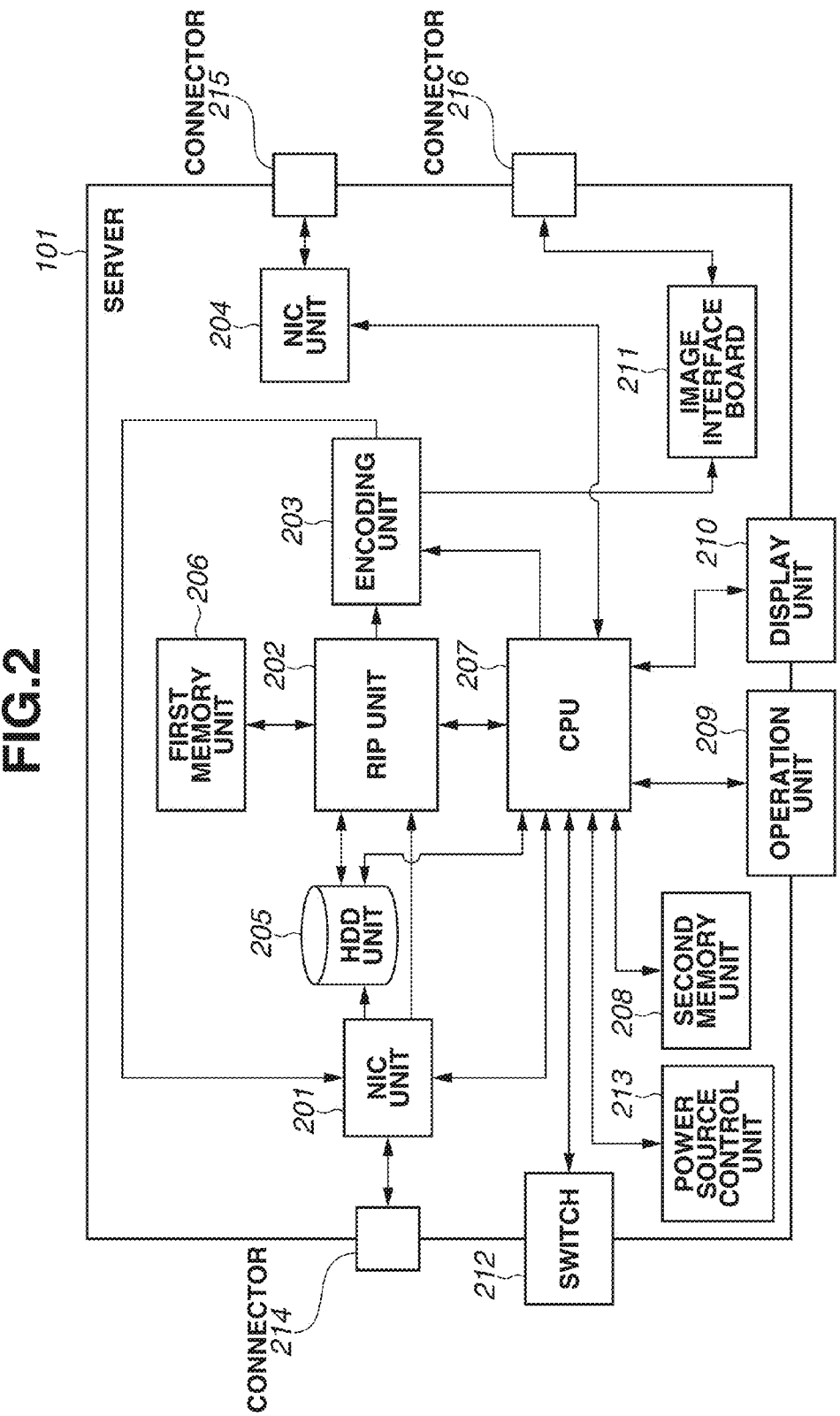
FIG. 2 is a block diagram illustrating a configuration of a server according to the first exemplary embodiment.

A configuration example of the server 101 according to the first exemplary embodiment of the present invention is described in detail below with reference to FIG. 2.

A network interface card (NIC) unit 201 is a first network interface that can control communications to be performed via the network 103. On the other hand, a NIC unit 204 is a second network interface that can control communications to be performed via the network 105. Each of the NIC unit 201 and the NIC unit 204 can be configured to control communications to be performed via a wireless LAN.

A raster image processing (RIP) unit 202 can perform processing for converting print language data, such as page description language (PDL) data received by the NIC unit 201, or a specific data format into a raster image.

An encoding unit 203 can perform processing for converting the raster image data into print data or a data format supported by the printing apparatus 102.

A hard disk drive (HDD) unit 205 can temporarily store (spool) the PDL data received by the NIC unit 201 or can temporarily store RIP processed compression data. Further, the HDD unit 205 can store system software applications for various processing described below in addition to data stored in a sheet information storing unit 401 illustrated in FIG. 4 and data stored in a sheet holding unit information storing unit 402 illustrated in FIG. 4. However, instead of using the HDD unit 205, the data stored in the sheet information storing unit 401 and the sheet holding unit information storing unit 402 can be stored in an appropriate nonvolatile memory, such as a solid state drive (SSD).

A central processing unit (CPU) 207 can control processing and operations to be performed by various units provided in the server 101. A first memory unit 206 is usable when the RIP unit 202 performs image rasterizing processing. On the other hand, the CPU 207 can use a second memory unit 208 as a temporary data storage area.

An operation unit 209 includes buttons, keys, and a touch panel to enable a user to operate the server 101. A display unit 210 can perform information presenting processing, which includes displaying images and text data. An image interface board 211 and a connector 216 for the image interface board 211 are usable to create image data and transfer the created image data to a dedicated transmission path. A switch 212 is operable to enter operational (e.g., power source startup and shutdown) instructions. When the switch 212 is operated, an interrupt signal is input to the CPU 207. The CPU 207 can control a power source control unit 213 according to an operational state in response to the interrupt signal.

A data packet, if it is transmitted from the information processing apparatus 104, can be input to the server 101 via the network 103 and a connector 214. In the server 101, the NIC unit 201 can perform data reception processing. When the NIC unit 201 receives print data, the NIC unit 201 performs processing for writing the received data into the HDD unit 205 under control of the CPU 207, if it is necessary. The above-mentioned processing is referred to as queuing (spool), which is generally performed to improve the transfer speed of data. The RIP unit 202 can read the data stored in the HDD unit 205 according to an instruction from the CPU 207.

Subsequently, the encoding unit 203, which is functionally operable as a data format conversion unit, performs processing for encoding received data into a data format that can be interpreted by the printing apparatus 102 based on the preliminarily set data format that can be interpreted by the printing apparatus 102 and the format of the received data. It is necessary that the encoded data has a format that can be interpreted by the printing apparatus 102.

The above-mentioned format is variable depending on the ability of a built-in interpretation means of the printing apparatus 102. For example, the format is a specific print language format or a data format compressed according to a specific method (e.g., JBIG). The NIC unit 204 performs data packet processing again to transmit the encoded data to the network 105. The data packet can be output from the connector 215 and transmitted to the printing apparatus 102 via the network 105. It is useful to transmit the encoded data to the printing apparatus 102 via a local interface, such as a universal serial bus (USB).

When the printing apparatus 102 receives the data packet, the printing apparatus 102 performs print processing on a recording medium (e.g., a sheet) according to its own print processing procedure.

As another data transfer method, the data can be transferred to the image interface board 211 via the encoding unit 203 and then can be output via the connector 216. Further, the data can be transmitted to the printing apparatus 102 via the video cable 106. The method includes appropriately acquiring information about power source state and startup state (normal/abnormal) of the server 101 and the printing apparatus 102. The information processing apparatus 104 sends a data packet to the server 101 based on the acquired information about power source state and startup state. The method includes periodically performing polling to acquire the information about power source state and startup state of the server 101 and the printing apparatus 102 at predetermined time intervals. The information processing apparatus 104 acquires a state change notification packet sent from the server 101 or the printing apparatus 102 and changes the processing content thereof. As an example, if the information processing apparatus 104 receives a power source shutdown notification packet from the printing apparatus 102, the polling can be interrupted in such a way as to prevent the network from being used uselessly.

<Configuration of Printing Apparatus>

A configuration example of the printing apparatus 102 according to the first exemplary embodiment of the present invention is described in detail below with reference to FIG. 3.

The printing apparatus 102 includes a plurality of sheet holding units 322. Each of the plurality of sheet holding units can be either a sheet feeding tray or a manual feeding tray. For example, the plurality of sheet holding units can be constituted by a combination of sheet feeding trays and a manual feeding tray.

Each sheet holding unit 322 includes a size detection sensor 325 that can detect the size of sheets stored in the sheet holding unit and an open/shut detection sensor 326 that can detect an open/shut operation for the sheet holding unit. The size of sheets stored in the sheet holding unit can be also acquired by accepting a user operation via an operation unit 318 of the printing apparatus 102. Alternatively, the size of sheets stored in the sheet holding unit can be imported from an external apparatus (e.g., the information processing apparatus 104).

The printing apparatus 102 can further include a sensor capable of detecting the remaining amount of sheets stored in each sheet holding unit 322 and a sensor capable of detecting characteristics (e.g., color and surface nature) of sheets stored in each sheet holding unit 322. Alternatively, the characteristics (e.g., color and surface nature) of sheets stored in each sheet holding unit can be acquired by accepting a user operation via the operation unit 318 of the printing apparatus 102 or can be imported from an external apparatus (e.g., the information processing apparatus 104).

The printing apparatus 102 is connected to a scanner 320 (i.e., an image input device) and a printer engine 301 (i.e., an image output device). The printing apparatus 102 can control image data reading and printing operations. Further, the printing apparatus 102 can perform a control to input and output image information and device information via the network or the video cable, in a state where the printing apparatus 102 is connected to the network, the video cable, or a telephone line.

A central processing unit (CPU) 302 can control various operations to be performed by the printing apparatus 102. A random access memory (RAM) 303 is functionally operable as a system work memory for the CPU 302 or an image memory that temporarily stores input image data. Further, a read only memory (ROM) 307 is a boot ROM that stores a system boot program. A hard disk drive (HDD) 308 can store system software applications and input image data that are necessary to perform various processing described below. Further, the HDD 308 can store setting information entered via the operation unit 318, setting information received from the server 101, and attribute information (e.g., sheet size) stored in the sheet holding unit 322. However, instead of using the HDD 308, it is useful to store the system software applications and input image data required to perform various processing in an appropriate nonvolatile memory, such as an SSD.

An operation unit I/F 304 is an interface unit configured to output operation screen data to the operation unit 318 that has an image data display screen. Further, the operation unit I/F 304 is functionally operable to transmit information, if it is input by a user via the operation unit 318, to the CPU 302. The operation unit 318 includes a touch panel portion and a key input portion although not illustrated. The operation unit 318 provides various interfaces that are usable to perform various settings and operations for the printing apparatus 102 according to the first exemplary embodiment.

A network I/F 305 can perform information input/output processing with an external apparatus via a network. The network I/F 305 can be realized, for example, by a LAN card. Alternatively, a wireless LAN is usable to perform the information input/output processing between the printing apparatus 102 and the external apparatus, if a wired network (e.g., LAN or WAN) is unavailable. A modem 306 can perform information input/output processing with an external apparatus via the telephone line. A video I/F 324 can perform information input/output processing with an external apparatus via the video cable.

The above-mentioned functional units are mutually connected via a system bus 323.

An image bus I/F 309 is an interface that connects the system bus 323 to an image bus 319 and operates as a bus bridge having a data structure conversion capability. The image bus 319 can speedily transfer image data. A raster image processor (RIP) 311, a device I/F 312, a scanner image processing unit 313, a printer image processing unit 314, and an image editing processing unit 315 are connected to each other via the image bus 319.

The RIP 311 is a raster image processor that can rasterize a page description language (PDL) as a raster image.

The device I/F 312 can transfer image data, if it is input from the scanner 320, to the HDD 308. Further, the device I/F 312 can transfer image data to the printer engine 301. However, instead of using the device I/F 312, it can be configured to transfer image data, if it is input from the scanner 320, to the HDD 308 according to an instruction from the CPU 302. Similarly, instead of using the device I/F 312, it can be configured to transfer the image data to the printer engine 301 according to an instruction from the CPU 302.

Further, the scanner image processing unit 313 can perform various (including correction) processing on image data, if it is input via the scanner 320. The printer image processing unit 314 can perform various (e.g., correction and resolution conversion) processing on image data to be printed out with reference to the capabilities of the printer engine 301. The image editing processing unit 315 can perform various (e.g., rotation and compression/decompression) image processing on image data.

A switch 317 is operable to input operational (e.g., power source startup and shutdown) instructions. When the switch 317 is operated, a power control unit 316 transmits an interrupt signal to the CPU 302. The CPU 302 controls the power control unit 316 according to an operational state in response to the interrupt signal.

A sheet holding unit control unit 321 is a module that can store a setting value of sheet attribute information for the sheet holding unit 322 of the printing apparatus (which may be also referred to as the sheet management system) and can control a sheet feeding operation. The printing apparatus 102 can control a printing operation based on the sheet attribute information stored as the setting value for the sheet holding unit. The sheet attribute information includes, for example, sheet size, sheet grammage, sheet color, and sheet type.

For example, the printing apparatus 102 determines an appropriate sheet holding unit 322 to be used in a printing operation based on the size of print sheets to be used for a job and controls the determined sheet holding unit 322 to perform a sheet feeding operation. Further, the printing apparatus 102 controls sheet conveyance speed or fixing device temperature based on sheet grammage or sheet type. The sheet holding unit control unit 321 acquires information relating to the open/shut operation of the sheet holding unit 322 from the open/shut detection sensor 326 and detects whether a sheet holding unit 322 being in an opened state has been shut.

Figure 4:
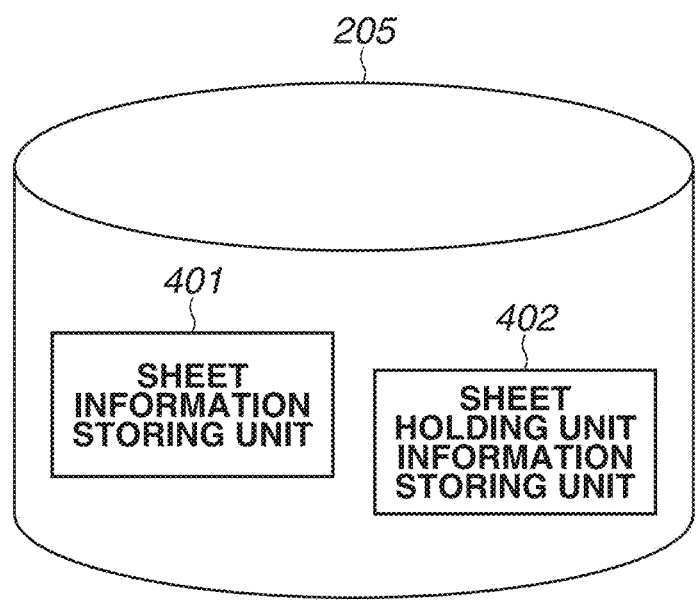
FIG. 4 illustrates data stored in a hard disk drive (HDD) unit of the server according to the first exemplary embodiment.

In the exemplary embodiment of the present invention, the sheet information storing unit 401 and the sheet holding unit information storing unit 402 are held as independent storage areas in the HDD unit 205 of the server 101 as illustrated in FIG. 4. As another exemplary embodiment, the HDD 308 of the printing apparatus 102 can be configured to have storage areas that are comparable to the above-mentioned storage areas of the HDD unit 205 of the server 101. Further, as another exemplary embodiment, the information processing apparatus 104 can be configured to have comparable storage areas in a nonvolatile memory thereof (not illustrated). In such a case, the data stored in the sheet information storing unit 401 and the sheet holding unit information storing unit 402 can be referred to via the network 103.

The sheet information storing unit 401 can store sheet attribute information registered by a user, as an attribute information table 602 having a list format illustrated in FIG. 6A. The sheet attribute information registered in the sheet information storing unit 401 includes, for example, ID, sheet name, sheet size, sheet grammage, sheet color, and sheet type. Further, registration target sheets in the sheet information storing unit 401 include printer maker evaluated sheets and user-defined sheets customized by a user based on standard sheets and evaluated sheets, in addition to ordinarily used sheets. Exemplary processing for registering sheet attribute information in the sheet information storing unit 401 is described in detail below with reference to FIG. 5.

On the other hand, the sheet holding unit information storing unit 402 associates a sheet arbitrarily selected by a user from sheets registered in the sheet information storing unit 401, with each sheet holding unit. The sheet holding unit information storing unit 402 includes an attribute information table 900 having a list format for storing attribute values representing sheet attribute information as illustrated in FIG. 9. The sheets registered in the sheet holding unit information storing unit 402 are desired sheets frequently used by the user in an associated sheet holding unit. Exemplary processing for registering sheet attribute information in association with each sheet holding unit in the sheet holding unit information storing unit 402 is described in detail below with reference to FIG. 6.

First, processing for registering sheet attribute information in the sheet information storing unit 401 is described in detail below with reference to the flowchart illustrated in FIG. 5. The server 101 can perform processing illustrated in FIGS. 5 7, 14, and 15. To attain the above-mentioned processing, the CPU 207 executes a program loaded from the HDD unit 205 and developed into the second memory unit 208. Although in the exemplary embodiment of the present invention the server 101 performs the above-mentioned processing, the printing apparatus 102 can perform similar processing. When the printing apparatus 102 performs the above-mentioned processing, the CPU 302 executes a program loaded from the HDD 308 and developed in the RAM 303. On the other hand, in a case where the information processing apparatus 104 is functionally operable as the server 101, the information processing apparatus 104 can perform similar processing.

In step S501, the CPU 207 determines whether a registration screen 600 illustrated in FIG. 6A has been called. The registration screen 600 illustrated in FIG. 6A can be displayed on the operation unit 209 of the server 101. The sheet attribute information includes, for example, ID, sheet name, sheet size, grammage, sheet color, and sheet type. The sheet attribute information can be registered in a list format on the registration screen 600.

As a determination result in step S501, if the CPU 207 determines that the registration screen 600 has been called (YES in step S501), the operation proceeds to step S502. Otherwise, the CPU 207 repeats the processing in step S501 until it is determined that the registration screen 600 has been called.

In step S502, the CPU 207 displays the registration screen 600 on the operation unit 209 of the server 101 to accept each pressing of the addition button 601 on the registration screen 600. Subsequently, the operation proceeds to step S503.

In step S503, the CPU 207 displays an addition screen 610 illustrated in FIG. 6B on the operation unit 209 of the server 101. The CPU 207 acquires sheet attribute information (e.g., sheet name, size, grammage, color, and type) input by a user. Then, the operation proceeds to step S504. The attribute information (e.g., sheet name, size, grammage, color, and type) can be imported from an external apparatus, such as the information processing apparatus 104 or the printing apparatus 102.

In step S504, the CPU 207 determines whether a registration button 611 has been pressed on the addition screen 610 illustrated in FIG. 6B. If the CPU 207 determines that the registration button 611 has been pressed (YES in step S504), the operation proceeds to step S505. Otherwise, the CPU 207 repeats the processing in step S504 until it is determined that the registration button 611 has been pressed.

In step S505, the CPU 207 registers the sheet attribute information acquired in step S503 in the sheet information storing unit 401 of the HDD unit 205 provided in the server 101. Then, after completing the processing in step S505, the CPU 207 terminates sequential processing for registering the sheet attribute information in the sheet information storing unit 401.

As mentioned above, the server 101 performs the sequential processing for registering the sheet attribute information in the sheet information storing unit 401. The printing apparatus 102 can perform similar processing comparable to the above-mentioned sequential processing performed by the server 101. More specifically, in performing the above-mentioned sequential processing, "the CPU 302", "the operation unit 318", and "the HDD 308" of the printing apparatus 102 are functionally comparable to "the CPU 207", "the operation unit 209", and "the HDD unit 205" of the server 101.

Figure 7:
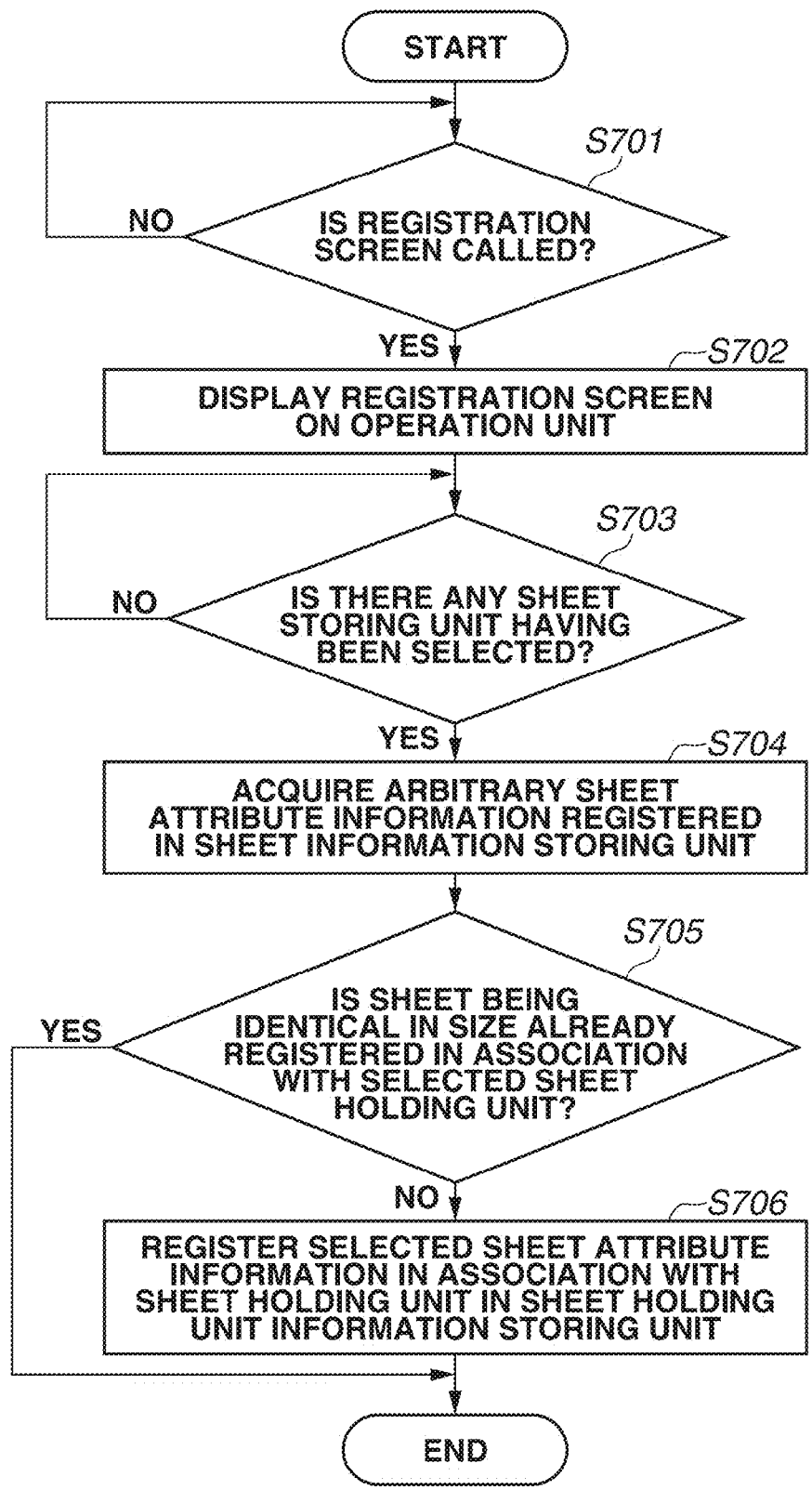
FIG. 7 is a flowchart illustrating processing that can be performed by the server according to the first exemplary embodiment to register sheet attribute information in association with a sheet holding unit in a sheet holding unit information storing unit.
Figure 8:
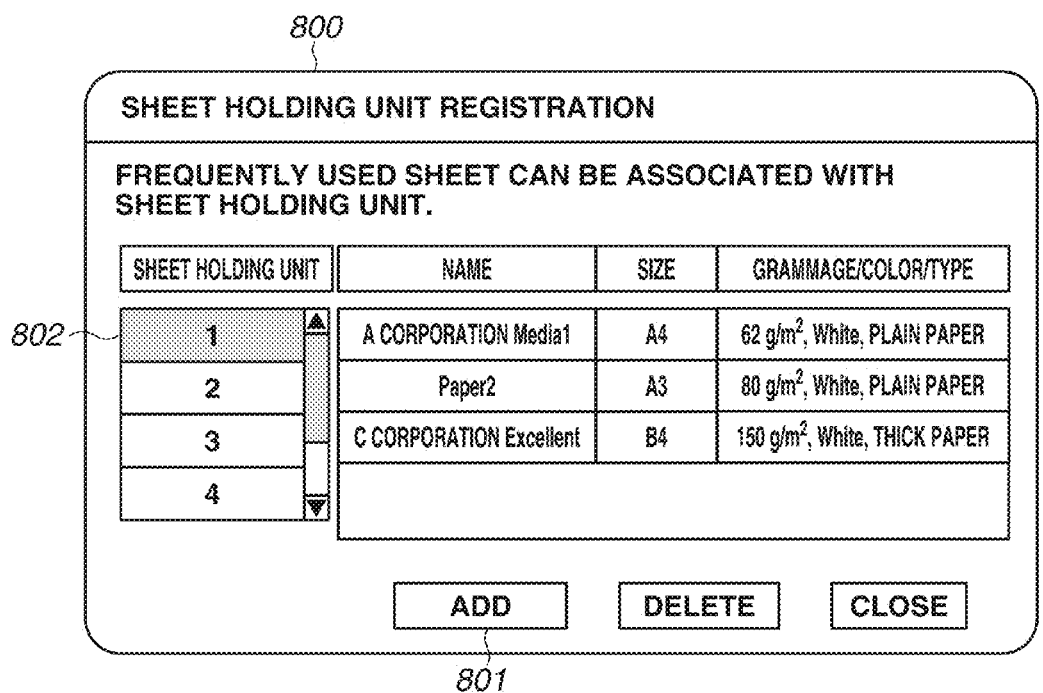
FIG. 8 illustrates an example of a registration screen that can be displayed on the server according to the first exemplary embodiment to enable a user to register sheet attribute information in association with a sheet holding unit in the sheet holding unit information storing unit.

Subsequently, processing for registering sheet attribute information in association with each sheet holding unit in the sheet holding unit information storing unit 402 is described in detail below with reference to a flowchart illustrated in FIG. 7. In step S701, the CPU 207 determines whether a registration screen 800 illustrated in FIG. 8 has been called on the operation unit 209 of the server 101. If the CPU 207 determines that the registration screen 800 has been called (YES in step S701), the operation proceeds to step S702. Otherwise, the CPU 207 repeats the processing in step S701 until it is determined that the registration screen 800 has been called.

In step S702, the CPU 207 displays the registration screen 800 on the operation unit 209 of the server 101. Then, the operation proceeds to step S703.

In step S703, the CPU 207 determines whether there is any sheet holding unit having been selected on the registration screen 800. According to the example illustrated in FIG. 8, a sheet feeding tray Tray1 is in a selected state because of a pressing of a sheet holding unit button 802 on the registration screen 800.

If the CPU 207 determines that a sheet holding unit has been selected (YES in step S703), the operation proceeds to step S704. Otherwise, the CPU 207 repeats the processing in step S703 until it is determined that a sheet holding unit has been selected.

In step S704, the CPU 207 refers to sheet attribute information registered in the sheet information storing unit 401 in response to a pressing of the addition button 801 on the registration screen 800. The place at which the sheet information storing unit 401 is stored is the HDD unit 205 of the server 101.

Then, the CPU 207 acquires attribute information about a sheet arbitrarily selected from the sheets registered in the sheet information storing unit 401. Then, the operation proceeds to step S705. The sheet attribute information acquired in step S704 is, for example, a combination including at least one of sheet name, sheet size, sheet grammage, sheet color, and sheet type. A part of the sheet attribute information (e.g., sheet size, grammage, color, or type) acquired in step S704 can be changed when its value is used. Further, the above-mentioned attribute information (e.g., sheet name, size, grammage, color, and type) can be imported from an external apparatus (e.g., the information processing apparatus 104 or the printing apparatus 102).

In step S705, the CPU 207 determines whether a sheet being identical in size with the sheet arbitrarily selected in step S704 is already registered in association with the sheet holding unit selected in step S703.

The sheet holding unit information storing unit 402 is restricted in such a way as to prevent a plurality of sheets being identical in size from being registered in association with one sheet holding unit. Therefore, it is feasible to uniquely determine sheet attribute information to be set as setting value of the sheet holding unit based on the size of sheets stored in the sheet holding unit 322 because the number of sheet sizes that can be registered in association with one sheet holding unit is restricted to only one.

The sheet attribute information to be set as sheet holding unit setting value is provisionally stored in the HDD 308 as sheet holding unit setting value. Then, each user can operate the operation unit 318 of the printing apparatus 102 to finalize the sheet holding unit setting value. The finalized sheet holding unit setting value can be stored in the HDD 308.

The attribute information table 900 includes attribute values (e.g., sheet name, size, grammage, color, and type) representing sheet attribute information registered in association with each sheet holding unit in a list format via the registration screen 800. For example, the sheet attribute information registered in association with the sheet feeding tray Tray1 includes a sheet having attribute values "name: A corporation Medial, size: A4, grammage: 62 g/m$^2$, color: White, and type: plain paper." Therefore, a sheet having attribute values "name: A corporation Medial, size: A4, grammage 80 g/m², color: Yellow, and type: coated paper" cannot be additionally registered as sheet attribute information corresponding to the sheet feeding tray Tray1.

In the present exemplary embodiment, the sheet holding unit 322 is equipped with the size detection sensor 325 capable of detecting the sheet size. Therefore, as mentioned above, the sheet holding unit information storing unit 402 is restricted in such a way as to prevent a plurality of sheets being identical in size from being registered in association with one sheet holding unit. Even in a case where the sheet holding unit 322 is not equipped with the size detection sensor 325, similar restriction will be feasible if the size of sheets stored in the sheet holding unit is acquirable.

On the other hand, in a case where a sheet holding unit is equipped with a sensor capable of detecting sheet color, grammage, or type, similar restriction will be feasible based on the detected sheet color, grammage, or type. Alternatively, similar restriction will be feasible if the color, grammage, or type of sheets stored in the sheet holding unit is acquirable. More specifically, the sheet holding unit information storing unit 402 can be restricted in such a way as to prevent a plurality of sheets being identical in color, grammage, or type from being registered in association with one sheet holding unit.

Figure 10:
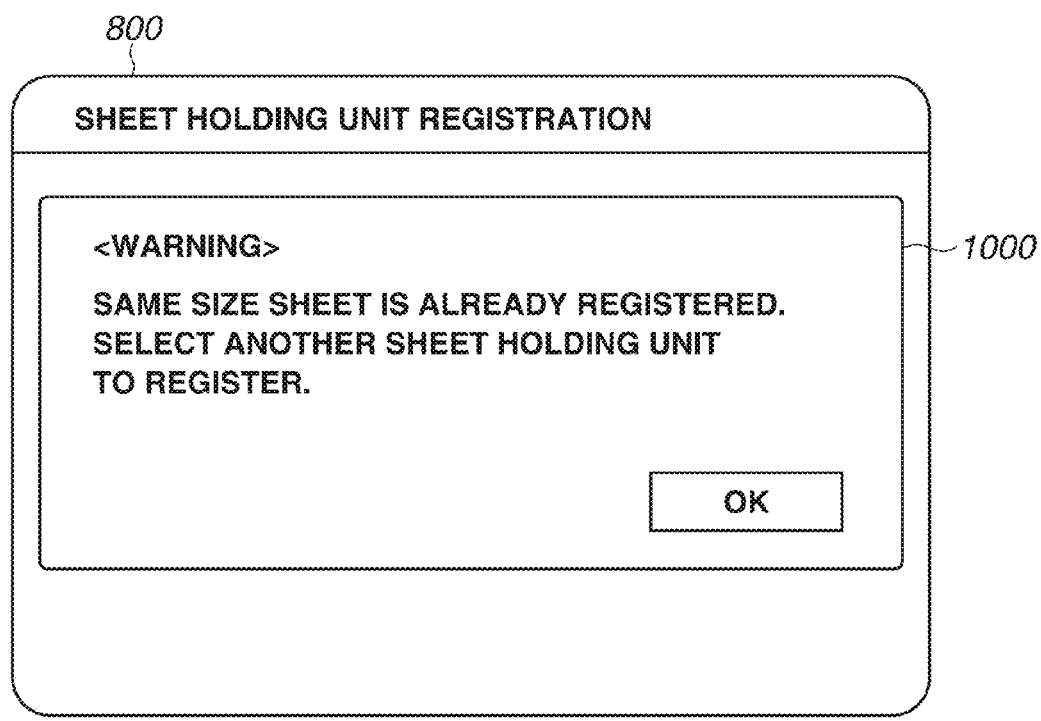
FIG. 10 illustrates an example of a warning screen that can be displayed on an operation unit of the printing apparatus according to the first exemplary embodiment.

As a determination result in step S705, if the CPU 207 determines that the same size sheet is not registered (NO in step S705), the operation proceeds to step S706. On the other hand, if the CPU 207 determines that the same size sheet is already registered (YES in step S705), the CPU 207 terminates the sequential processing for registering sheet attribute information in association with each sheet holding unit in the sheet holding unit information storing unit 402. For example, it is useful to display a warning screen 1000 illustrated in FIG. 10 (i.e., a screen that notifies a user of the presence of a sheet being identical in size with the selected sheet that is already registered in association with the sheet holding unit) on the operation unit 209 of the server 101 if it is determined that the same size sheet is already registered before terminating the sequential processing.

In step S706, the CPU 207 registers the selected sheet attribute information in association with the sheet holding unit selected in step S703 in the sheet holding unit information storing unit 402 provided in the HDD unit 205 of the server 101. For example, the sheet having the sheet attribute information represented by the attribute values "name: A corporation Medial, size: A4, grammage: 62 g/m², color: White, and type: plain paper" is registered in association with each of the sheet feeding tray Tray1 and the sheet feeding tray Tray4 in the attribute information table 900 illustrated in FIG. 9. As mentioned above, in the sheet holding unit information storing unit 402, it is permitted to register the same sheet in association with a plurality of sheet holding units.

Then, after completing the processing in step S706, the CPU 207 terminates the sequential processing for registering sheet attribute information in association with each sheet holding unit in the sheet holding unit information storing unit 402.

As mentioned above, the server 101 can perform the sequential processing for registering sheet attribute information in association with each sheet holding unit in the sheet holding unit information storing unit 402. The printing apparatus 102 can perform similar processing comparable to the above-mentioned sequential processing performed by the server 101. More specifically, in performing the above-mentioned sequential processing, "the CPU 302", "the operation unit 318", and "the HDD 308" of the printing apparatus 102 are functionally comparable to "the CPU 207", "the operation unit 209", and "the HDD unit 205" of the server 101.

The processing according to the first exemplary embodiment includes acquiring sheet attribute information uniquely identified from the sheet holding unit information storing unit 402 provided in the HDD unit 205 of the server 101 and setting the acquired sheet attribute information as setting value of the sheet holding unit provided in the printing apparatus (which may be also referred to as the sheet management system).

Further, the printing system according to the first exemplary embodiment performs the following processing in a case where attribute information about a sheet to be used in a job is not registered in any one of the sheet holding units 322. More specifically, the processing according to the first exemplary embodiment includes referring to sheet attribute information registered in the sheet holding unit information storing unit 402. The processing further includes searching for a sheet corresponding to the attribute information about the sheet to be used in the job that is registered in association with any one of the sheet holding units in the sheet holding unit information storing unit 402. The processing further includes determining a sheet holding unit registered in association with the attribute information about the sheet to be used in the job, which is one of the sheets registered in the sheet holding unit information storing unit 402, based on the search result, and notifying a user of the determined sheet holding unit. In this case, the user replenishes the determined sheet holding unit with the sheet to be used in the job. Hereinafter, processing for setting sheet attribute information registered in the sheet holding unit information storing unit 402, which is the attribute information about the sheet to be used in the job, as setting value of the sheet holding unit is described in detail below.

Further, in describing an operation that can be performed by the printing system according to the first exemplary embodiment, it is presumed that the attribute information table illustrated in FIG. 9 is already registered in the sheet holding unit information storing unit 402.

Figure 11:
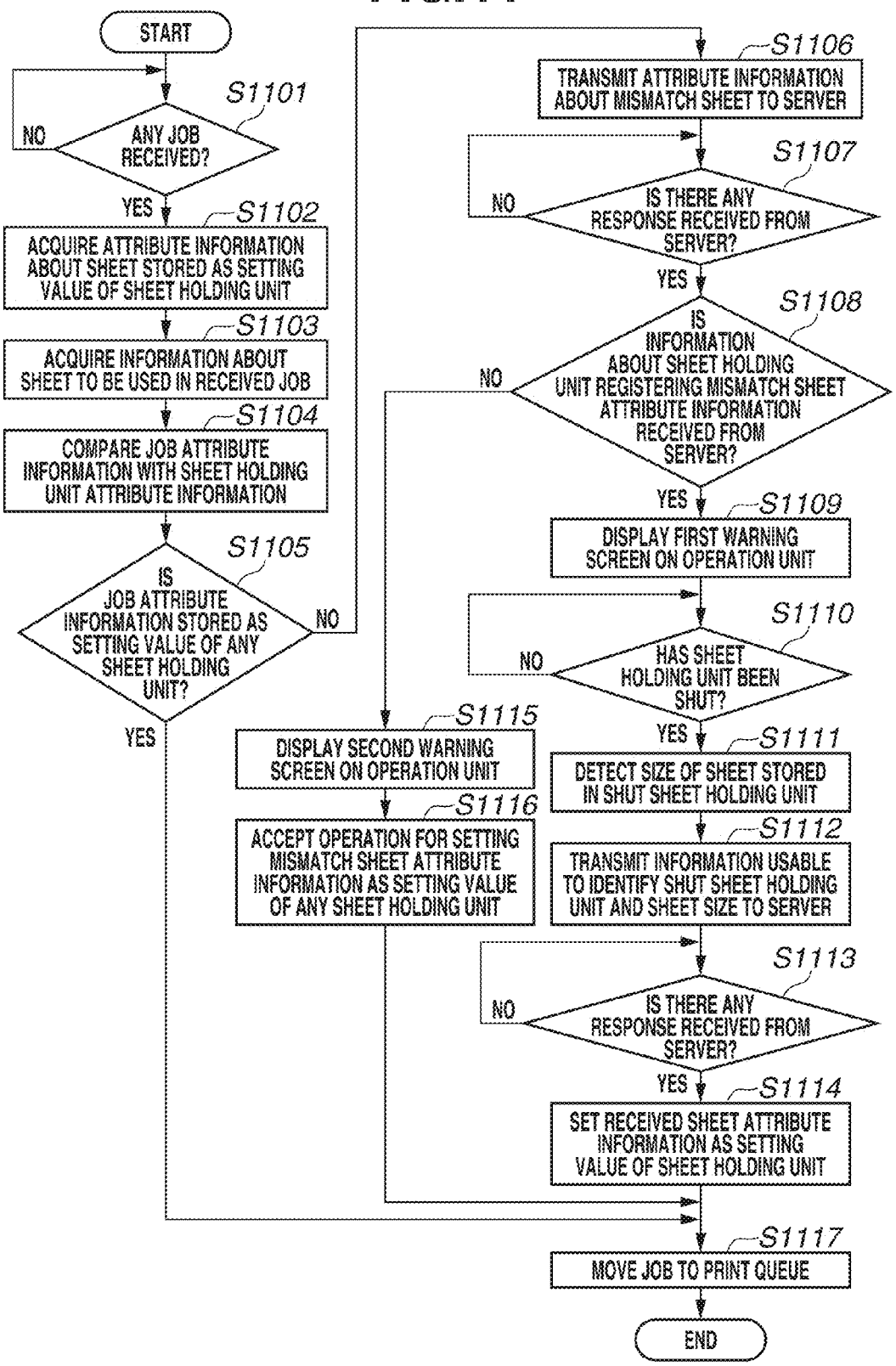
FIG. 11 is a flowchart illustrating processing that can be performed by the printing apparatus according to the first exemplary embodiment to set a setting value of a sheet holding unit based on attribute information about a sheet to be used in a job.

Sequential processing that can be performed by the printing apparatus 102 according to the first exemplary embodiment, including setting a sheet holding unit setting value based on attribute information about a sheet to be used in a job, is described in detail below with reference to a flowchart illustrated in FIG. 11. To attain the above-mentioned processing, the CPU 302 of the printing apparatus 102 executes a program loaded from the HDD 308 and developed into the RAM 303.

In step S1101, the CPU 302 determines whether the network I/F 305 has received a job (i.e., print data). In this case, print data received by the NIC unit 201 of the server 101 or print data once written in the HDD unit 205 can be transmitted via the connector 215. Then, the print data can be transmitted to the network I/F 305 of the printing apparatus 102 via the network 105. As a determination result in step S1101, if the CPU 302 determines that there is a job having been received (YES in step S1101), the operation proceeds to step S1102. Otherwise, the CPU 302 repeats the processing in step S1101 until it is determined that a job has been received.

In step S1102, the CPU 302 reads and acquires sheet attribute information (hereinafter, referred to as "sheet holding unit attribute information"), which is stored as setting value of the sheet holding unit provided in the printing apparatus 102, from the HDD 308. Then, the operation proceeds to step S1103. In a case where the printing apparatus 102 includes a plurality of sheet holding units, a plurality of pieces of sheet holding unit attribute information can be acquired.

In step S1103, the CPU 302 acquires job attribute information, which is sheet attribute information to be referred to in the job received in step S1101. Then, the operation proceeds to step S1104. If there is a plurality of types of sheets to be used in the job, a plurality of pieces of sheet attribute information can be acquired.

In step S1104, the CPU 302 compares the job attribute information acquired in step S1103 with the sheet holding unit attribute information acquired in step S1102. Then, the operation proceeds to step S1105.

In step S1105, the CPU 302 determines whether the job attribute information is stored as setting value of any one of the sheet holding units provided in the printing apparatus 102, as a comparison result in step S1104.

In a case where there is a plurality of types of sheets to be used in the job, the CPU 302 determines whether all of the attribute information about the sheets to be used in the job is stored as setting values of any one of the sheet holding units.

As a determination result in step S1105, if the CPU 302 determines that the job attribute information is stored as the setting value of any one of the sheet holding units (YES in step S1105), the operation proceeds to step S1117. Processing to be performed in step S1117 is described in detail below. On the other hand, if the CPU 302 determines that there is not any job attribute information stored as setting value of any one of the sheet holding units (NO in step S1105), the operation proceeds to step S1106.

In step S1106, the CPU 302 transmits attribute information about a mismatch sheet (i.e., a sheet being not stored as a setting value of any one of the sheet holding units), which constitutes a part of the sheet attribute information to be used in the job, to the server 101 via the network 105. Then, the operation proceeds to step S1107. The information transmitted by the printing apparatus 102 in step S1106 can be received by the server 101 in step S1401 illustrated in FIG. 14.

In step S1107, the CPU 302 determines whether there is any response having been received from the server 101 via the network 105, after transmitting the mismatch sheet attribute information to the server 101. If the CPU 302 determines that there is a response (YES in step S1107), the operation proceeds to step S1108. Otherwise, the CPU 302 repeats the processing in step S1107 until it is determined that a response has been received.

If a predetermined time has elapsed without receiving any response from the server 101, the CPU 302 can perform time-out processing. Namely, the CPU 302 can terminate the sequential processing without setting any specific sheet holding unit setting information based on the attribute information about the sheet to be used in the job. Further, in this case, the CPU 302 can notify a user of the time-out result by displaying a warning screen (not illustrated) on the operation unit 318 of the printing apparatus 102. In the time-out processing, the CPU 302 can display a paper feeding setting screen 1200 illustrated in FIG. 12 on the operation unit 318 to enable the user to set the mismatch sheet attribute information as arbitrary sheet holding unit setting value.

The information to be received by the printing apparatus 102 in step S1107 can be transmitted by the server 101 in step S1408 illustrated in FIG. 14.

In step S1108, the CPU 302 determines whether information about a sheet holding unit registered in association with the mismatch sheet attribute information in the sheet holding unit information storing unit 402 provided in the HDD unit 205 of the server 101 has been received from the server 101 via the network 105. The information to be received by the printing apparatus 102 in step S1108 can be transmitted by the server 101 in step S1407 illustrated in FIG. 14.

As a determination result in step S1108, if the CPU 302 determines that the above-mentioned sheet holding unit information has been received (YES in step S1108), the operation proceeds to step S1109.

Figure 13A:
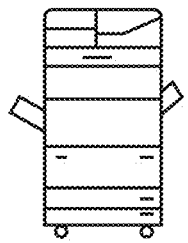
FIGS. 13A and 13B illustrates examples of warning screens that can be displayed on the operation unit of the printing apparatus according to the first exemplary embodiment.

In step S1109, the CPU 302 displays a warning screen 1300 illustrated in FIG. 13A on the operation unit 318, to inform the sheet holding unit registered in association with the mismatch sheet attribute information in the sheet holding unit information storing unit 402. Then, the operation proceeds to step S1110.

For example, it is now determined that attribute values representing the mismatch sheet attribute information are "size: A3, grammage: 128 g/m$^2$, and type: thick paper" and the mismatch sheet attribute information is registered beforehand in the sheet holding unit information storing unit 402 in association with the sheet feeding tray Tray3. In such a case, in step S1109, as illustrated in the warning screen 1300 (see FIG. 13A), the CPU 302 recommends the user to replenish the sheet feeding tray Tray3 (i.e., the sheet holding unit) with the mismatch sheets (i.e., A3 thick papers) because the mismatch sheet (i.e., A3 thick paper) is not stored in any one of the sheet holding units. If the user confirms the warning screen 1300 illustrated in FIG. 13A displayed on the operation unit 318, the user will open the sheet feeding tray Tray3 (i.e., the sheet holding unit) to replenish the opened sheet feeding tray Tray3 with the mismatch sheets (i.e., A3 thick papers) and then shut the sheet feeding tray Tray3.

In step S1110, the CPU 302 determines whether the sheet holding unit has been shut after having been opened and replenished with the mismatch sheets according to the warning screen 1300 illustrated in FIG. 13A. In this case, it is presumed that the user opens sheet holding unit to store the mismatch sheets and then shut the sheet holding unit after completing the replenishment of the mismatch sheets. The CPU 302 can refer to information acquired from the open/shut detection sensor 326 illustrated in FIG. 3 in determining whether the sheet holding unit has been shut.

If the CPU 302 determines that the sheet holding unit has been shut (YES in step S1110), the operation proceeds to step S1111. Otherwise, the CPU 302 repeats the processing in step S1110 until it is determined that the sheet holding unit has been shut.

Figure 3:
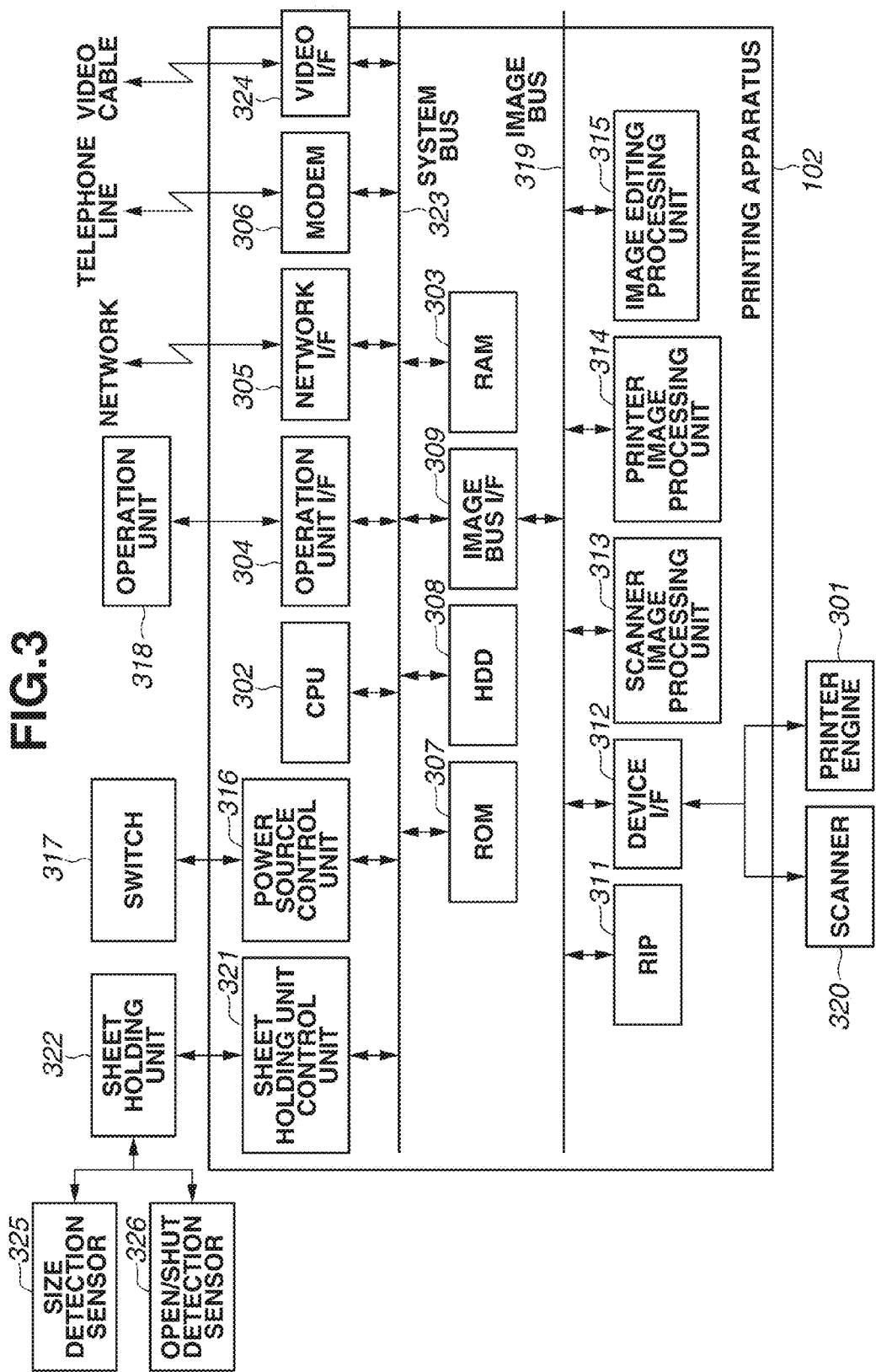
FIG. 3 is a block diagram illustrating a configuration of a printing apparatus according to the first exemplary embodiment.

In step S1111, the CPU 302 causes the size detection sensor 325 illustrated in FIG. 3 to detect the size of sheets stored in the sheet holding unit having been shut. Then, the operation proceeds to step S1112. Alternatively, the size of sheets stored in the sheet holding unit having been shut can be acquired by accepting a user operation on the operation unit 318 of the printing apparatus 102 or can be imported from an external apparatus (e.g., the information processing apparatus 104).

In step S1112, the CPU 302 transmits information usable to identify the sheet holding unit having been shut (e.g., unique number of the sheet holding unit) and the sheet size detected (or acquired) in step S1111 to the server 101 via the network 105. Then, the operation proceeds to step S1113.

The information usable to identify the sheet holding unit having been shut is information required to identify a search target sheet holding unit in searching for a sheet registered beforehand in association with the sheet holding unit in the sheet holding unit information storing unit 402. Further, the size of sheets stored in the sheet holding unit is information required to uniquely identify a sheet from the sheets registered in association with the search target sheet holding unit. The information transmitted by the printing apparatus 102 in step S1112 can be received by the server 101 in step S1501 illustrated in FIG. 15.

In step S1113, the CPU 302 determines whether there is any response having been received from the server 101 via the network 105, after transmitting the information usable to identify the sheet holding unit having been shut and the detected (acquired) sheet size to the server 101. As a determination result in step S1113, if the CPU 302 determines that there is a response (YES in step S1113), the operation proceeds to step S1114. Otherwise, the CPU 302 repeats the processing in step S1113 until it is determined that a response has been received.

If a predetermined time has elapsed without receiving any response from the server 101, the CPU 302 can perform time-out processing. Namely, the CPU 302 can terminate the sequential processing without setting any specific sheet holding unit setting information based on the attribute information about the sheet to be used in the job. Further, in this case, the CPU 302 can notify the user of the time-out result by displaying a warning screen (not illustrated) on the operation unit 318 of the printing apparatus 102. In the time-out processing, the CPU 302 can display the paper feeding setting screen 1200 illustrated in FIG. 12 on the operation unit 318 to enable the user to set the mismatch sheet attribute information as setting value of arbitrary sheet holding unit.

The information received by the printing apparatus 102 in step S1113 can be transmitted by the server 101 in step S1408 illustrated in FIG. 14.

In step S1114, the CPU 302 sets the sheet attribute information (e.g., sheet size, grammage, color, and type) received from the server 101 via the network 105 as setting value of the sheet holding unit having been shut. Then, the operation proceeds to step S1117.

The sheet attribute information to be set as sheet holding unit setting value in step S1114 is provisionally stored in the HDD 308 as sheet holding unit setting value. Therefore, if the attribute information having been set as the sheet holding unit setting value is not acceptable, the user can change the sheet attribute information to be set as sheet holding unit setting value. More specifically, the CPU 302 can display the paper feeding setting screen 1200 illustrated in FIG. 12 on the operation unit 318 so that the mismatch sheet attribute information can be set as arbitrary sheet holding unit setting value. Then, the user can finalize the sheet holding unit setting value on the operation unit 318 of the printing apparatus 102. The finalized sheet holding unit setting value can be stored in the HDD 308.

The information received by the printing apparatus 102 in step S1114 can be transmitted by the server 101 in step S1503 illustrated in FIG. 15.

On the other hand, as a determination result in step S1108, if the CPU 302 determines that the information about the sheet holding unit registered in association with the mismatch sheet attribute information is not yet received from the server 101 (NO in step S1108), the operation proceeds to step S1115.

Figure 13B:
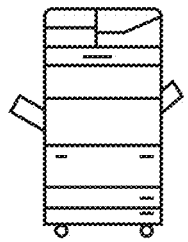

In step S1115, the CPU 302 displays a warning screen 1310 illustrated in FIG. 13B on the operation unit 318 to inform that the attribute information about the sheet to be used in the job is not stored as setting value of any one of the sheet holding units and therefore paper feeding setting is necessary. Then, the operation proceeds to step S1116.

Figure 12:
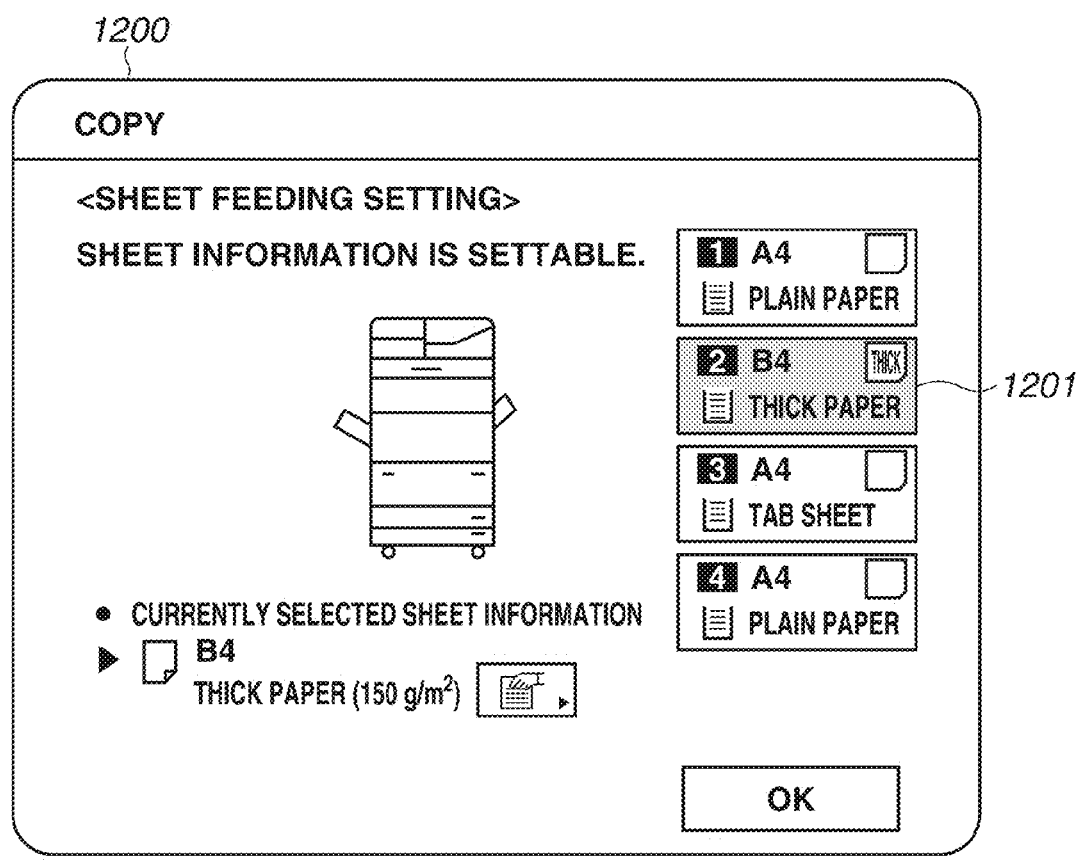
FIG. 12 illustrates an example of a paper feeding setting screen that can be displayed on the printing apparatus according to the first exemplary embodiment to enable a user to set sheet attribute information for a sheet holding unit.

In step S1116, the CPU 302 displays the paper feeding setting screen 1200 illustrated in FIG. 12 on the operation unit 318 to accept a user operation for setting the mismatch sheet attribute information as setting value of any one of the sheet holding units on the paper feeding setting screen 1200. Then, the operation proceeds to step S1117.

In step S1117, the CPU 302 moves the job received in step S1101 to a print queue. In other words, at this moment, the execution of the job is feasible because the attribute information about the sheet to be used in the job is already set as setting value of any one of the sheet holding units.

The print queue is a queue that stores two or more jobs sequentially arrayed according to the instructed print order. The print queue is stored as a storage area in the HDD 308 of the printing apparatus 102. When the job having been moved to the print queue is executed, the CPU 302 controls the sheet conveyance speed and the fixing device temperature based on the sheet holding unit attribute information (e.g., grammage, color, and type). The CPU 302 executes the job while the sheets are supplied from the sheet holding unit.

After completing the processing in step S1119, the CPU 302 terminates the sequential processing for setting the sheet holding unit setting value based on the attribute information about the sheet to be used in the job.

As mentioned above, the printing apparatus 102 according to the first exemplary embodiment can perform sequential processing for setting sheet holding unit setting value based on attribute information about a sheet to be used in a job.

As mentioned above, the printing system according to the present exemplary embodiment displays the warning screen 1300 on the operation unit 318 to notify a user of the sheet holding unit that should be replenished with mismatch sheets. However, the processing according to the present invention is not limited to the above-mentioned example. For example, instead of displaying the warning screen 1300 on the operation unit 318, it is useful that the printing apparatus 102 controls the sheet holding unit that should be replenished with mismatch sheets to automatically open so that the user can replenish the automatically opened sheet holding unit with mismatch sheets.

The printing system according to the present exemplary embodiment detects (acquires) the size of sheets stored in a sheet holding in response to the shutting of the sheet holding unit and transmits the detected (acquired) sheet size to the server 101, and then performs the subsequent processing. However, the processing according to the present invention is not limited to the above-mentioned example.

It is now presumed that the size of a sheet stored in a sheet holding unit is detectable (acquirable) even in a state where the sheet holding unit is in an opened state. In this case, for example, in response to the elapse of a predetermined time after the opening of the sheet holding unit, the detected (acquired) sheet size can be transmitted to the server 101 before starting the subsequent processing. Alternatively, it is useful to provide a dedicated button on the operation unit 318 of the printing apparatus 102 to transmit the size of the sheet stored in the sheet holding unit to the server 101 in response to a pressing of the button before starting the subsequent processing.

Next, sequential processing for searching for a sheet registered in the sheet holding unit information storing unit 402, which can be performed by the server 101 according to the first exemplary embodiment, is described in detail below with reference to a flowchart illustrated in FIG. 14.

In step S1401, the CPU 207 receives the mismatch sheet attribute information from the printing apparatus 102 via the network 105. Then, the operation proceeds to step S1402. The information received by the server 101 in step S1401 can be transmitted by the printing apparatus 102 in the above-mentioned step S1106 illustrated in FIG. 11.

In step S1402, the CPU 207 refers to the sheet holding unit information storing unit 402 provided in the HDD unit 205 of the server 101 to check sheet attribute information registered in association with each sheet holding unit. Then, the operation proceeds to step S1403.

In step S1403, the CPU 207 determines whether processing for searching for the sheet holding unit registered in association with the mismatch sheet attribute information (i.e., steps S1404 to S1407) has been completed for all sheet holding units. As a determination result in step S1403, if the CPU 207 determines that the above-mentioned search processing is not yet completed (NO in step S1403), the operation proceeds to step S1404.

In step S1404, the CPU 207 determines a search target sheet holding unit (i.e., the sheet holding unit registered in association with the mismatch sheet attribute information). Then, the operation proceeds to step S1405.

In step S1405, the CPU 207 compares the mismatch sheet attribute information received in step S1401 with sheet attribute information registered in association with the sheet holding unit determined in step S1404. Then, the operation proceeds to step S1406.

In step S1406, the CPU 207 determines whether the mismatch sheet attribute information is registered in association with the sheet holding unit in the sheet holding unit information storing unit 402, based on a comparison result in step S1405. If the CPU 207 determines that the mismatch sheet attribute information is registered (YES in step S1406), the operation proceeds to step S1407.

In step S1407, the CPU 207 determines that the mismatch sheet attribute information is registered in association with the sheet holding unit. Then, the CPU 207 transmits information indicating that the mismatch sheet attribute information is registered in association with the determined sheet holding unit to the printing apparatus 102 via the network 105. The information transmitted by the server 101 in step S1407 can be received by the printing apparatus 102 in the above-mentioned step S1108 illustrated in FIG. 11.

On the other hand, if the CPU 207 determines that the above-mentioned processing for searching for the sheet holding unit registered in association with the mismatch sheet attribute information (see steps S1404 to S1407) has been completed for all sheet holding units (YES in step S1403), the operation proceeds to step S1408.

In step S1408, the CPU 207 transmits a response informing that the processing in the server 101 has been completed to the printing apparatus 102 via the network 105. The information transmitted by the server 101 in step S1408 can be received by the printing apparatus in the above-mentioned step S1107 illustrated in FIG. 11. After completing the processing in step S1408, the CPU 207 terminates the processing for searching for the sheet registered in the sheet holding unit information storing unit 402.

As mentioned above, the server 101 according to the first exemplary embodiment can perform the sequential processing for searching for a sheet registered in the sheet holding unit information storing unit 402 provided in the HDD unit 205 of the server 101. The printing apparatus 102 can perform similar processing comparable to the above-mentioned sequential processing performed by the server 101. More specifically, in performing the above-mentioned sequential processing, "the CPU 302" and "the HDD 308" of the printing apparatus 102 are functionally comparable to "the CPU 207" and "the HDD unit 205" of the server 101.

Subsequently, sequential processing for transmitting sheet attribute information uniquely identified from the sheet holding unit information storing unit 402 to the printing apparatus 102, which can be performed by the server 101 according to the first exemplary embodiment, is described in detail below with reference to the flowchart illustrated in FIG. 15.

In step S1501, the CPU 207 receives the information usable to identify the sheet holding unit having been shut and the sheet size from the printing apparatus 102 via the network 105. Then, the operation proceeds to step S1502. The information to be received by the server 101 in step S1501 can be transmitted from the printing apparatus 102 in the above-mentioned step S1112 illustrated in FIG. 11.

In step S1502, the CPU 207 refers to the sheet holding unit information storing unit 402 provided in the HDD unit 205 of the server 101 to check sheet attribute information registered in association with the identified sheet holding unit, based on the information usable to identify the sheet holding unit received in step S1501. Then, the operation proceeds to step S1503.

In step S1503, the CPU 207 uniquely identifies a same size sheet among the sheets having been referred to in step S1502, based on the sheet size received in step S1501. Then, the operation proceeds to step S1504. The sheet attribute information uniquely identified in step S1503 corresponds to mismatch sheet attribute information.

In step S1504, the CPU 207 transmits the sheet attribute information (e.g., sheet size, grammage, color, and type) uniquely identified in step S1503 to the printing apparatus 102 via the network 105. Then, the operation proceeds to step S1505. The information transmitted by the server 101 in step S1504 can be received by the printing apparatus 102 in the above-mentioned step S1114 illustrated in FIG. 11.

In step S1505, the CPU 207 transmits a response informing that the processing in the server 101 has been completed to the printing apparatus 102 via the network 105. The information transmitted by the server 101 in step S1505 can be received by the printing apparatus 102 in the above-mentioned step S1113 illustrated in FIG. 11. After completing the processing in step S1505, the CPU 207 terminates the processing for transmitting the sheet attribute information uniquely identified from the sheet holding unit information storing unit 402 to the printing apparatus 102.

As mentioned above, the server 101 according to the first exemplary embodiment can perform the sequential processing for transmitting sheet attribute information uniquely identified from the sheet holding unit information storing unit 402 provided in the HDD unit 205 of the server 101 to the printing apparatus 102. The printing apparatus 102 can perform similar processing comparable to the above-mentioned sequential processing performed by the server 101. More specifically, in performing the above-mentioned sequential processing, "the CPU 302" and "the HDD 308" of the printing apparatus 102 are functionally comparable to "the CPU 207" and "the HDD unit 205" of the server 101.

Subsequently, an example according to the first exemplary embodiment is described in detail below.

In the example described below, it is presumed that attribute values representing attribute information about a sheet to be used in a received job are "size: A4, grammage: 100 g/m², and type: plain paper."

FIG. 16A illustrates sheet attribute information stored as setting values of each sheet holding unit provided in the printing apparatus 102.

Further, the attribute information table 900 illustrated in FIG. 9 stores information about sheets registered in association with each sheet holding unit in the sheet holding unit information storing unit 402 provided in the HDD unit 205 of the server 101.

As a result of the comparison between the job attribute information and the sheet holding unit attribute information in step S1104, it is determined that the attribute information about the sheet to be used in the job (i.e., size: A4, grammage: 100 g/m², and type: plain paper) is not stored as setting value of any one of the sheet holding units (NO in step S1105).

Accordingly, in step S1106, the attribute information about the sheet to be used in the job (i.e., size: A4, grammage: 100 g/m², and type: plain paper) is transmitted, as mismatch sheet attribute information, from the printing apparatus 102 to the server 101.

In step S1401, the server 101 receives the mismatch sheet attribute information (size: A4, grammage: 100 g/m², and type: plain paper) from the printing apparatus 102.

As a result of the search processing (in steps S1403 to S1406), the CPU 207 determines that the mismatch sheet attribute information (size: A4, grammage: 100 g/m², and type: plain paper) is already registered in association with the sheet feeding tray Tray3 (i.e., one of the sheet holding units) in the sheet holding unit information storing unit 402 (YES in step S1406).

Accordingly, in step S1407, information indicating that the mismatch sheet attribute information (size: A4, grammage: 100 g/m², and type: plain paper) is already registered in association with the sheet feeding tray Tray3 is transmitted from the server 101 to the printing apparatus 102.

The printing apparatus 102 receives information about the sheet holding unit (i.e., the sheet feeding tray Tray3) registered in association with the mismatch sheet attribute information (size: A4, grammage: 100 g/m², and type: plain paper) from the server 101 (YES in step S1108).

In step S1109, the warning screen 1300 illustrated in FIG. 13A is displayed on the operation unit 318 of the printing apparatus 102. If a user confirms the warning screen 1300 illustrated in FIG. 13A, the user opens the sheet feeding tray Tray3 (i.e., the sheet holding unit) to store the mismatch sheet therein and then shuts the sheet feeding tray Tray3 (YES in step S1110).

Further, in step S1112, information usable to identify the sheet holding unit having been shut (e.g., unique number of Tray3) and the detected sheet size (i.e., A3) are transmitted from the printing apparatus 102 to the server 101.

In step S1501, the server 101 receives the information usable to identify the sheet holding unit having been shut (e.g., unique number of Tray3) and the sheet size (A3) from the printing apparatus 102.

In step S1502, the server 101 refers to the sheet attribute information (FIG. 9) registered in association with the identified sheet holding unit (i.e., the sheet feeding tray Tray3). Then, in step S1503, the server 101 uniquely identifies a sheet having the same size (A3) based on the received sheet size (A3).

Then, in step S1504, the server 101 transmits the uniquely identified sheet attribute information (name: B corporation Premium, size: A3, grammage: 128 g/m², color: White, and type: thick paper) to the printing apparatus 102.

In step S1114, the printing apparatus 102 sets the sheet attribute information received from the server 101 (i.e., size: A3, grammage: 128 g/m², color: White, and type: thick paper) as setting value of the sheet holding unit (i.e., the sheet feeding tray Tray3). Then, in step S1117, the printing apparatus 102 moves the job to the print queue.

As mentioned above, the printing system according to the first exemplary embodiment registers sheet attribute information in association with each sheet holding unit in the sheet holding unit information storing unit 402 provided in the HDD unit 205 of the server 101 beforehand. After a sheet is stored in a sheet holding unit, the printing system acquires the attribute information (e.g., the size of the stored sheet). Then, the printing system can automatically set another sheet attribute information registered in association with the sheet holding unit as setting value of the sheet holding unit based on the acquired attribute information (e.g., the size).

More specifically, in a case where attribute information about a sheet to be used in a job is not registered for any one of sheet holding units, the printing system prevents the execution of the job from being stopped, by searching the sheet holding unit information storing unit 402 for a sheet holding unit registered beforehand in association with the attribute information about the sheet to be used in the job. Then, based on the search result, the printing system identifies the sheet holding unit registered in association with the attribute information about the sheet to be used in the job and notifies a user of the identified sheet holding unit. The user can easily and automatically set the attribute information about the sheet to be used in the job as setting value of the sheet holding unit by storing the sheet to be used in the job in the determined sheet holding unit.

Therefore, when the attribute information about a sheet to be used in a job is not registered for any one of sheet holding units, it is unnecessary for the user to input the mismatch sheet attribute information every time. Further, it is unnecessary to find out a sheet registered in a sheet management database.

The present invention is not limited to the above-mentioned exemplary embodiments. The exemplary embodiments can be modified in various ways within the scope of the present invention. The present invention does not exclude such modifications (including any possible combination of the above-described exemplary embodiments).

For example, the detectable (acquirable) attribute information about a sheet stored in a sheet holding unit is not limited to only one (e.g., sheet size). It is useful to detect (acquire) and transmit a plurality of types of attribute information. The printing system can start the subsequent processing based on the detected (acquired) plurality of types of attribute information.

Further, for example, the information to be transmitted to the server 101 is not limited to the size of sheets stored in a sheet holding unit. For example, as another exemplary embodiment, a sheet holding unit can be equipped with a sensor capable of detecting sheet color, grammage, or type. The detected information, such as sheet color, grammage, or type, can be registered in the sheet information storing unit 401 and the sheet holding unit information storing unit 402. In such a case, in addition to the sheet size, the detected information (e.g., sheet color, grammage, or type) can be transmitted to the server 101, so that a sheet can be determined based on the sheet size and the additional information (e.g., sheet color, grammage, or type). Further, it is feasible to transmit only the sheet color information to the server 101 so that a sheet can be determined based on only the sheet color.

More specifically, in a case where attribute information including at least one of sheet size, grammage, color, and type can be acquired as attribute information about a sheet stored in a sheet holding unit, at least one attribute information in addition to the acquired attribute information can be set as setting values of the sheet holding unit.

Further, in the above-mentioned embodiment, the printing apparatus 102 and the external server 101 are connected via the network 105. However, as another exemplary embodiment, the server 101 can be configured to operate as a built-in printing control apparatus of the printing apparatus 102 so that the server 101 and the printing apparatus 102 can cooperatively perform a part or the whole of the above-mentioned various controls. Further, the printing apparatus 102 can be configured to independently perform a part or the whole of the above-mentioned various controls without relying on the processing in the server 101 (i.e., the printing control apparatus). More specifically, the server 101 (serving as the printing control apparatus) can be united with the printing apparatus 102 or the information processing apparatus 104. Further, the printing apparatus 102 can be connected to a plurality of information processing apparatuses 104 via the network 103 (e.g., LAN or WAN) or an appropriate wireless LAN in such a way as to perform a part or the whole of the above-mentioned various controls.

Although the present invention has been described based on various examples and exemplary embodiments, it will be apparent to the person skilled in the art that the meaning and scope of the present invention should not be narrowly interpreted with reference to specific features mentioned above.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-013793 filed Jan. 28, 2014, which is hereby incorporated by reference herein in its entirety.

What is claimed is:

1. A printing system including:
   a printing apparatus having:
   a plurality of sheet holding units, wherein the printing apparatus is able to print an image on a sheet conveyed from a sheet holding unit from among the plurality of sheet holding units, and
   a first sending unit configured to send, to a printing control apparatus, a size of a sheet designated in a job; and
   the printing control apparatus, wherein the printing control apparatus includes:
   a storing unit configured to store, in association with each of a first sheet holding unit and a second sheet holding unit of the printing apparatus, a size of a sheet and attribute information of the sheet,
   a first receiving unit configured to receive the size sent by the first sending unit,
   a determining unit configured to determine, based on the size received by the first receiving unit, attribute information of a sheet and a sheet holding unit from among the first sheet holding unit and the second sheet holding unit, wherein the size received by the first receiving unit and the attribute information of the sheet is stored in association with the sheet holding unit in the storing unit, and
   a second sending unit configured to send, to the printing apparatus, the attribute information determined by the determining unit and information indicating the sheet holding unit determined by the determining unit,
   wherein the printing apparatus further includes:
   a second receiving unit configured to receive the attribute information and the information indicating the sheet holding unit determined by the determining unit sent by the second sending unit,
   a notification unit configured to notify a user of the sheet holding unit indicated by the information received by the second receiving unit,
   a setting unit configured to set the attribute information received by the second receiving unit, as attribute information of a sheet to be stored in the sheet holding unit indicated by the information received by the second receiving unit, and
   a printing unit configured to print, based on the attribute information set by the setting unit, an image on a sheet conveyed from the sheet holding unit indicated by the information received by the second receiving unit,
   wherein at least one of the first sending unit, the first receiving unit, the determining unit, the second sending unit, the second receiving unit, the notification unit, and the setting unit is implemented by a processor and a memory.

2. The printing system according to claim 1, wherein the printing apparatus further includes:
   a holding unit configured to hold a size of the sheet to be stored in each of the plurality of sheet holding units,
   wherein, in a case where the size designated in the job does not match the size of the sheet held in the holding unit, the first sending unit sends the size designated in the job to the printing control apparatus.

3. The printing system according to claim 1, wherein the printing apparatus further includes:
   a detection unit configured to detect whether a sheet holding unit of the printing apparatus has been shut, wherein, in a case where the detection unit detects that the sheet holding unit indicated by the information received by the second receiving unit has been shut, the setting unit sets the attribute information received by the second receiving unit, as the attribute information about the sheet to be stored in the sheet holding unit indicated by the information received by the second receiving unit.

4. The printing system according to claim 1, wherein the attribute information includes at least one of sheet grammage, sheet color, and sheet type.

* * * * *